United States Patent
Gomi et al.

(10) Patent No.: US 8,576,285 B2
(45) Date of Patent: Nov. 5, 2013

(54) IN-VEHICLE IMAGE PROCESSING METHOD AND IMAGE PROCESSING APPARATUS

(75) Inventors: Toshiaki Gomi, Kawasaki (JP); Jun Kawai, Kawasaki (JP); Katsutoshi Yano, Kawasaki (JP); Hiroshi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 857 days.

(21) Appl. No.: 12/654,673

(22) Filed: Dec. 29, 2009

(65) Prior Publication Data

US 2010/0245573 A1 Sep. 30, 2010

(30) Foreign Application Priority Data

Mar. 25, 2009 (JP) .................................. 2009-75166

(51) Int. Cl.
*H04N 7/18* (2006.01)
(52) U.S. Cl.
USPC ............................ 348/148; 348/143; 348/113
(58) Field of Classification Search
USPC .......... 348/113, 116, 118, 122, 148; 382/154, 382/123, 101, 285, 291
See application file for complete search history.

(56) References Cited

U.S. PATENT DOCUMENTS

| | | | |
|---|---|---|---|
| 6,539,288 B2* | 3/2003 | Ishida et al. ...................... | 701/1 |
| 7,161,616 B1 | 1/2007 | Okamoto et al. | |
| 7,307,655 B1 | 12/2007 | Okamoto et al. | |
| 2002/0018047 A1* | 2/2002 | Okada et al. ................... | 345/156 |
| 2003/0085999 A1 | 5/2003 | Okamoto et al. | |
| 2003/0108222 A1 | 6/2003 | Sato et al. | |
| 2006/0132482 A1* | 6/2006 | Oh ................................. | 345/419 |
| 2008/0198226 A1* | 8/2008 | Imamura ....................... | 348/148 |

FOREIGN PATENT DOCUMENTS

| | | |
|---|---|---|
| EP | 1 179 958 A1 | 2/2002 |
| JP | 2003-204547 | 7/2003 |
| JP | 2003-244688 | 8/2003 |
| JP | 2006-171849 | 6/2006 |
| JP | 2007-36668 | 2/2007 |
| JP | 2007-180720 | 7/2007 |
| JP | 2007-183877 | 7/2007 |

(Continued)

OTHER PUBLICATIONS

European Search Report dated Aug. 25, 2010 in corresponding European Patent Application 09180898.0.
Japanese Office Action issued Sep. 28, 2012 in corresponding Japanese Patent Application No. 2009-075166.

(Continued)

*Primary Examiner* — Andy Rao
(74) *Attorney, Agent, or Firm* — Staas & Halsey LLP

(57) ABSTRACT

An image processing apparatus is provided that combines image data captured by multiple cameras and displays the resulting image of surroundings of the vehicle to monitor monitoring the surroundings of a vehicle. The image processing apparatus includes: an image memory; a camera-image acquisition unit; a projection surface geometry manager that manages projection surface geometry information including a set of three-dimensional coordinates for a projection surface that is virtually formed to surround the vehicle; a viewing movement controller that determines viewing information so that a viewpoint and a viewing direction relative to the projection surface are continuously transited according to a given viewing transition regulation; an image converter that projects and combines the image data on the projection surface, and converts the combined image data into two-dimensional image data; a display unit that displays the two-dimensional image data; and a periodic rendering trigger generator that generates a trigger signal to start an image conversion process by the image converter.

8 Claims, 24 Drawing Sheets

(56) References Cited

FOREIGN PATENT DOCUMENTS

| KR | 2001-0112433 | 12/2001 |
| WO | 00/07373 | 2/2000 |
| WO | WO00/64175 | 10/2000 |
| WO | 2006/053271 A1 | 5/2006 |

OTHER PUBLICATIONS

Korean Office Action mailed Dec. 19, 2011 issued in corresponding Korean Patent Application No. 10-2009-0129458.

Office Action issued by the Korean Patent Office on Mar. 25, 2013 in the corresponding Korean patent application No. 10-2009-0129458.

\* cited by examiner

IN-VEHICLE IMAGE PROCESSING METHOD AND IMAGE PROCESSING APPARATUS

CROSS-REFERENCE TO RELATED APPLICATION

This application is based upon and claims the benefit of priority of the prior Japanese Patent Application No. 2009-75166, filed on Mar. 25, 2009, the entire contents of which are incorporated herein by reference.

FIELD

The present invention relates to an image processing method and image processing apparatus that processes a surrounding monitoring image for monitoring the surroundings of a vehicle using image data captured by multiple cameras that are carried by the vehicle.

BACKGROUND

Visibility supporting systems have been widely used. In such a system, a camera is mounted onto a rear part or a blind corner of a vehicle such as an automobile, to display the image of a blind spot around the vehicle that is hardly observed by a driver at a driver's seat. For example, when an image captured by a camera at a rear part of a vehicle is displayed, a driver can perceive the situation of the rear space of the vehicle without turning back by checking the displayed image.

Another type of visibility supporting systems that provide image data using multiple cameras mounted to a vehicle body, instead of a single camera, also have been successfully implemented.

For example, in Japanese Patent Application Laid-Open No. 2007-183877, an apparatus for combining image data is discussed. The combination is effected based on the videos obtained by four cameras located on the front, rear, right and left side of a vehicle body, so that a driver can perceive the full surroundings of the vehicle by a single check of the combined image data.

The apparatus described in the above patent generates an overhead image like a view from above a vehicle to appropriately support the driving operation of a driver of the vehicle.

The display of an overhead image viewed from above the vehicle on a display screen, as in the apparatus described in the above patent, facilitates the check of the current position of a vehicle and the trace of the vehicle to a target position during parallel parking, garage parking and angled parking, by a driver.

A driver of a vehicle can check the surroundings of the vehicle by the eyes just before the driver gets in the vehicle. But since a moving object may rapidly approach the vehicle after the driver got in the vehicle, it is desirable to monitor the surroundings of the vehicle including blind spots from a driver's seat using an image.

SUMMARY

Unfortunately, the overhead image obtained by the apparatus such as that described in the above patent displays only the close vicinity of the vehicle. The monitoring of a vehicle using such image may cause delay in perceiving the approach of a moving object from a far-off point.

In addition, the overhead image viewed from above a vehicle displays the image of an object that is located rearward of the vehicle upside down. This further precludes the driver's correct perception of the object rearward of the vehicle.

An image processing apparatus according to the present invention includes an in-vehicle image processing apparatus capable to link to multiple cameras mounted to a vehicle, the image processing apparatus comprising: an image memory that stores multiple image data captured by each of the cameras; a camera-image acquisition unit that inputs and stores the multiple image data captured by each of the cameras into the image memory; a projection surface geometry manager that manages projection surface geometry information including a set of three-dimensional coordinates for a projection surface that is virtually formed to surround the vehicle; a viewing movement controller that determines viewing information so that a viewpoint and a viewing direction relative to the projection surface are continuously transited according to given viewing transition regulations; an image converter that projects and combines each of the image data stored in the image memory on the projection surface, and converts the combined image data into two-dimensional image data based on the viewing information determined by the viewing movement controller; a display unit that displays the two-dimensional image data converted by the image converter; and a periodic rendering trigger generator that generates a trigger signal to make the image converter start an image conversion process.

An image processing method is making a computer program cause a computer to function as an in-vehicle image processing apparatus capable to link to multiple cameras mounted to a vehicle, the method comprising: inputting image data captured by the multiple cameras and storing each of the image data into an image memory of the computer by the computer; virtually forming three-dimensional projection surface geometry information around the vehicle, projecting and combining each of the image data stored in the image memory to the projection surface by the computer, and converting the combined image data into two-dimensional image data based on viewing information that is determined according to a given viewing transition regulation by the computer; and displaying the converted two-dimensional image data by the computer.

A recording medium storing a program for an image processing method according to the present invention comprising: inputting image data captured by the multiple cameras and storing each of the image data into an image memory of the computer by the computer; virtually forming three-dimensional projection surface geometry information around the vehicle, projecting and combining each of the image data stored in the image memory to the projection surface by the computer, and converting the combined image data into two-dimensional image data based on viewing information that is determined according to a given viewing transition regulation by the computer; and displaying the converted two-dimensional image data by the computer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

The present invention is achieved in view of the above problems in the art, and is directed to provide an image processing method and image processing apparatus that generates a surrounding monitoring image for monitoring the surroundings of a vehicle by moving a viewpoint while an image of surroundings of the vehicle is displayed, the image being obtained by combining image data from multiple cameras.

An image processing apparatus, an image processing method and a program for the image processing method of the present invention are described in detail below based on the illustrated embodiments.

First Embodiment (Configuration)

Figure 1:
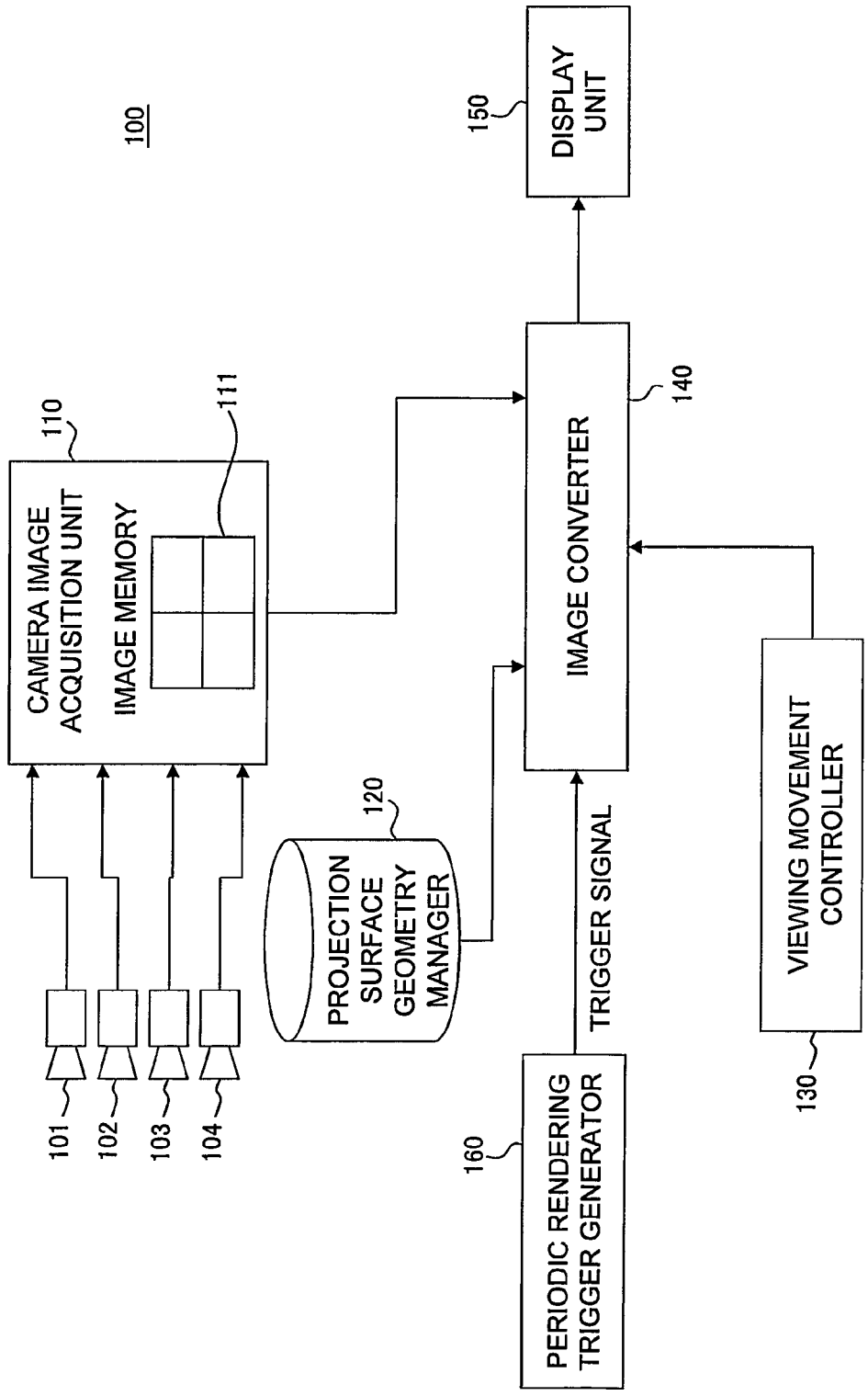
FIG. 1 is a functional block diagram illustrating an image processing apparatus of a first embodiment.

FIG. 1 is a functional block diagram illustrating an image processing apparatus of a first embodiment.

A image processing apparatus 100 of the first embodiment includes multiple cameras 101 to 104, an image memory 111, a camera-image acquisition unit 110, a projection surface geometry manager 120, a viewing movement controller 130, an image converter 140, a display unit 150, and a periodic rendering trigger generator 160.

Figure 2:
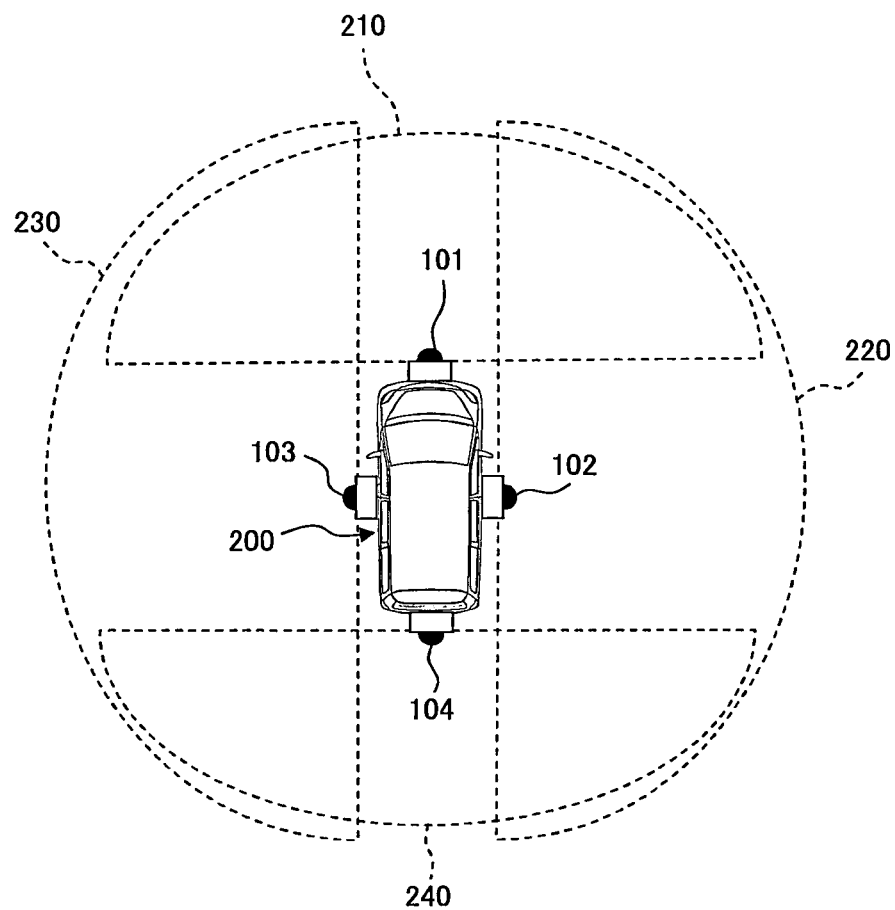
FIG. 2 illustrates camera mount positions and image capturing ranges by the cameras.

In the first embodiment, the multiple cameras 101 to 104 are mounted to the front, rear, right and left part of a vehicle 200 as illustrated in FIG. 2. The number of the camera is not limited to four, but a less number of cameras increases blind spots of the vehicle, and an excessive number of cameras increases image portions overlapping one another. The computation required for image processing is also increased in proportion to the number of the cameras.

FIG. 2 illustrates camera mount positions and image capturing ranges by the cameras.

In FIG. 2, the front camera 101 is mounted at the center of the front bumper of the vehicle 200 to capture an image in front of the vehicle 200; the rear camera 104 is mounted at the center of the rear bumper of the vehicle 200 to capture an image behind the vehicle 200; the right camera 103 is mounted at the center of the right side surface of the vehicle 200 to capture an image on the right side the vehicle 200; and the left camera 103 is mounted at the center of the left side surface of the vehicle 200 to capture an image on the left side the vehicle 200.

The cameras 101 to 104 use ultra wide angle lenses, each lens having an angle of view of 180 degrees. This enables, as illustrated in FIG. 2, the front camera 101 to capture an image of the front area 210; the right camera 102 to capture an image of the right side area 220; the left camera 103 to capture an image of the left side area 230; and the rear camera 104 to capture an image of the back area 240. The adjacent areas for the cameras 101 to 104 partially overlap each other.

The cameras 101 to 104 are, as shown, positioned at the centers of the front, right-side, left-side, and rear surfaces of the vehicle 200 respectively, but the positions are not limited to the center, and may be offset from the center as long as the partial overlapping between the adjacent image capturing areas are attained. For example, the right camera 102 and the left camera 103 may be mounted to the right and left door mirrors of the vehicle 200, respectively. The number of the camera is not limited to four as long as the partial overlapping between the adjacent image capturing areas are attained and the resulting areas surround 360 degrees of the vehicle 200.

The cameras 101 to 104 each capture images (image data) at 30 frames per second using image pickup devices such as CCDs (Charge Coupled Device) and CMOSs (Complementary Metal Oxide Semiconductor). The digital image data captured by the cameras 101 to 104 are transmitted to the camera-image acquisition unit 110, and stored in the image memory 111.

The image memory 111 is configured with a frame buffer that sequentially stores the image data captured by the cameras 101 to 104.

The camera-image acquisition unit 110 periodically acquires the image data captured by the cameras 101 to 104 for storage of the data in the image memory 111.

The projection surface geometry manager 120 stores a set of the coordinates of a three-dimensional projection surface that is virtually formed around the vehicle as projection surface geometry information, and may be a record medium such as hard disk or flash memory.

The viewing movement controller 130 determines viewing information according to given viewing transition regulation so that a viewpoint and a viewing direction are continuously transited relative to the projection surface.

The image converter 140 projects and combines image data in the image memory 111 on the projection surface, and converts the combined image data into two-dimensional image data based on the viewing information determined by the viewing movement controller 130.

The display unit 150 displays the image data generated by the image converter 14, and may be a liquid crystal display. The display unit 150 may use the display device equipped to a car navigation system.

The periodic rendering trigger generator 160 generates a trigger signal to start an image conversion process by the image converter 140.

(Hardware Configuration)

Figure 3:
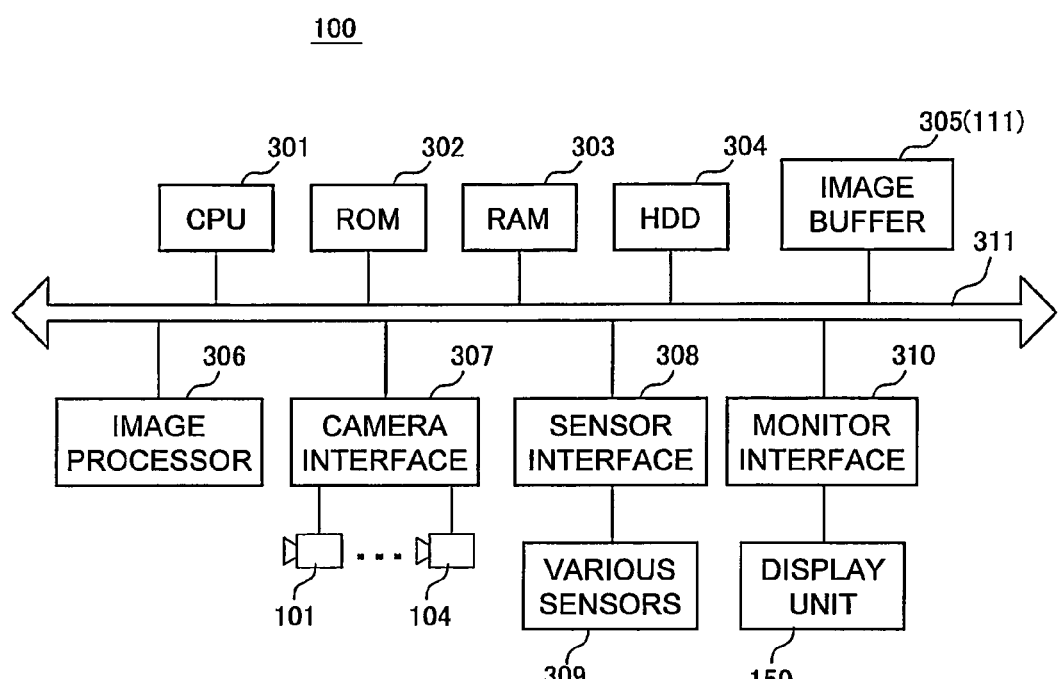
FIG. 3 is a functional block diagram illustrating a hardware configuration of the image processing apparatus of the first embodiment.

FIG. 3 is a functional block diagram illustrating a hardware configuration of the image processing apparatus of the first embodiment.

The image processing apparatus 100 is a computer system including a CPU 301, a ROM 302, a RAM 303, a hard disk drive (HDD) 304, an image buffer 305 (111), an image processer 306, a camera interface 307, a sensor interface 308 and a monitor interface 310. Each of the hardware components are connected to one another via a bus 311.

The CPU 301 controls each of the hardware components, and reads and executes control programs stored in the ROM 302 and the HDD 304 to make the computer having the hardware components operate as an image processing apparatus.

The ROM 302 stores various control programs and various parameters that are required for the operations of the image processing apparatus 100. The RAM 303 is a memory device such as SPAM and flash memory, and temporarily stores various data during the control programs executed by the CPU 301.

The HDD 304 stores, in advance, the control programs required for the operations of the image processing apparatus 100 and data for three-dimensional image conversion.

The image buffer 305 stores image data captured by the cameras 101 to 104, and is a memory device such as SPAM and flash memory.

The image processer 306 performs given image processing on the image data captured by the cameras 101 to 104 and stored in the image buffer 305, and outputs the resulting image data to the display unit 150. After the given image processing, the image processer 306 converts the image data into display data such as data in NTSC (National Television System Committee) standard format, and outputs the display data to the display unit 150.

The camera interface 307 is connected to each of the cameras 101 to 104, and transmits the image data captured by each of the cameras 101 to 104, to the image buffer 305 in series for storage.

The sensor interface 308 is connected to various sensors 309 equipped to the vehicle 200 to store the detection signals detected by the sensors 309 in a given area of the RAM 303 for storage, or to transmit the signals to the CPU 301.

The various sensors 309 connected to the sensor interface 308 include a vehicle speed sensor, a shift position sensor, a parking brake sensor, a GPS (Global Positioning System) sensor, a steering angle sensor and an obstacle detection sensor.

The vehicle speed sensor detects the running speed of a vehicle, and may use a hall element to detect the rotation of a shaft of the vehicle. The shift position sensor detects the operating position of a shift lever, and detects the shift position of a gear in a gearbox casing. The parking brake sensor detects an application of a parking brake, and may be configured with a relay that is turned on/off by operations of the parking brake lever. The steering angle sensor is provided to a rotation shaft of a steering wheel to detect the rotation angle of the steering wheel.

The GPS sensor has an antenna for receiving radio waves (GPS signals) from multiple GPS satellites, and detects the current position of the vehicle based on the received GPS signals. The GPS sensor obtains the detected current position as positional information including the data of the latitude, longitude and altitude of the position.

The obstacle detection sensors are installed in the front bumper and the rear bumper of the vehicle 200 to detect the distance between the vehicle 200 and an obstacle, and may be optical sensors or ultrasonic sensors.

The signals detected by the sensors 309 are transmitted to the CPU 301 via the sensor interface 308, and are stored in a given area of the RAM 303 as needed.

The sensors 309 may further include a sensor for detection of a degree of stepping the acceleration pedal and a sensor for detection of a degree of stepping the brake pedal, for example.

The monitor interface 310 is connected to the display unit 150, and outputs the image data generated as the result of the given image processing by the image processer 306 to the display unit 150.

(Viewing Transition Regulation)

The image converter 140 forms a virtual three-dimensional projection surface around the vehicle 200 based on the projection surface geometry stored in the projection surface geometry manager 120, and projects image data from the cameras 101 to 104 to the three-dimensional projection surface.

Figure 4:
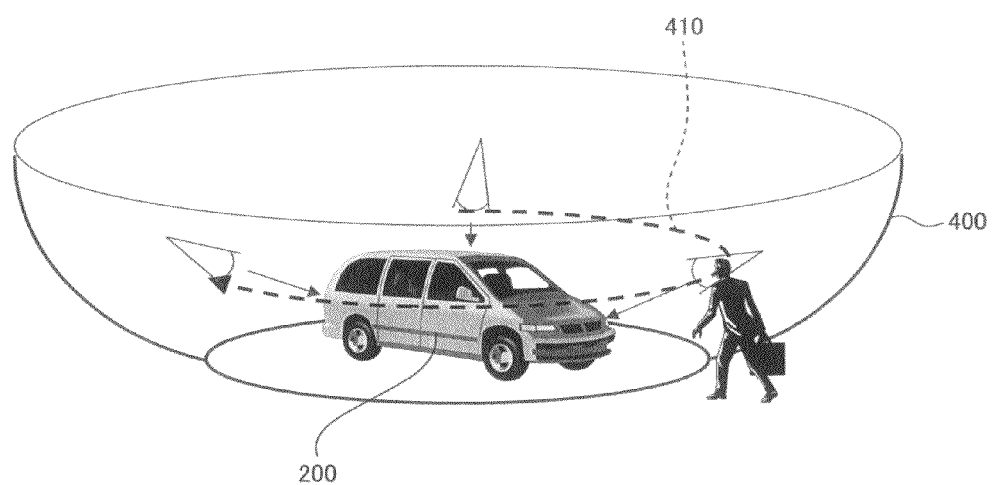
FIG. 4 illustrates the relationship between projection surface and viewing transition.

FIG. 4 illustrates the relationship between a projection surface and viewing transitions.

As illustrated in FIG. 4, a cup-like three-dimensional projection surface 400 is virtually formed around the vehicle 200. The projection surface geometry manager 120 stores three-dimensional coordinate information relative to the vehicle 200 as projection surface geometry information for forming the three-dimensional projection surface 400.

The image converter 140 uses the two-dimensional images captured by the cameras 101 to 104 and stored in the image memory 111, and generates three-dimensional images to be projected to the three-dimensional projection surface 400, based on the projection surface geometry information in the projection surface geometry manager 120.

The image converter 140 converts the three-dimensional projection surface 400 into two-dimensional image data based on a viewpoint and a viewing direction in viewing information generated by the viewing movement controller 130.

The viewing movement controller 130 changes the viewpoint and the viewing direction in the viewing information so that a smooth trajectory of viewing transition 410 is drawn, based on given viewing transition regulation.

Figure 5:
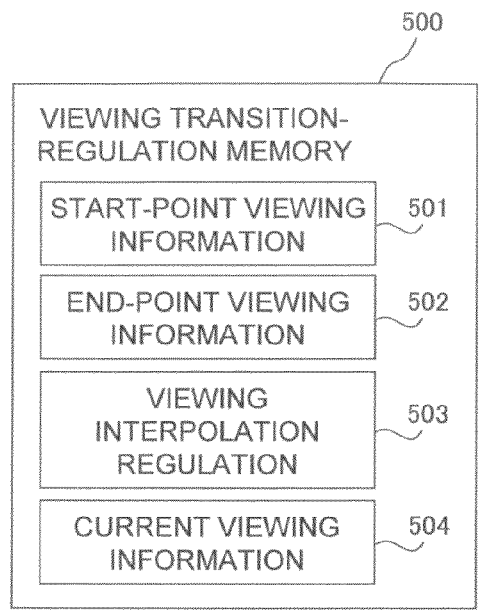
FIG. 5 illustrates a viewing transition-regulation memory.

FIG. 5 illustrates a viewing transition-regulation memory 500 that stores the viewing transition regulation that is used by the viewing movement controller 130 to transit viewing information.

The viewing transition-regulation memory 500 is provided in a given memory area, and contains: start-point viewing information 501 of the viewpoint and the viewing direction at the start of viewing transition; end-point viewing information 502 of the viewpoint and the viewing direction at the end of viewing transition; viewing interpolation regulation 503 for interpolation of the transits in the viewing information between the start-point viewing information 501 and the end-point viewing information 502; and current viewing information 504 of the current viewpoint and viewing direction.

Figure 6:
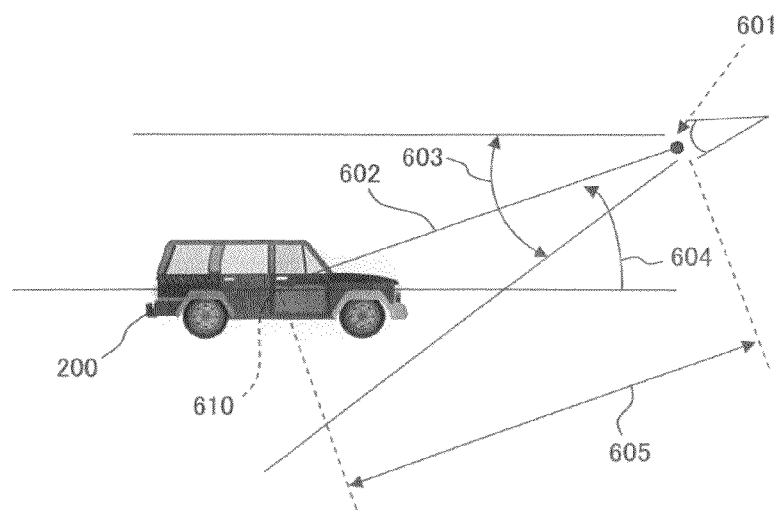
FIG. 6 illustrates viewing information with respect to a vertical cross sectional plane between a viewpoint and a viewing target.

FIG. 6 illustrates viewing information with respect to a vertical cross sectional plane between a viewpoint and a viewing target.

The viewing information illustrated in FIG. 6 includes: a vertical angle of view 603 that indicates a given angle of the field of view around a view centerline 602 connecting a viewpoint 601 to a viewing target 610 when the vehicle 200 is observed from the viewpoint 601; an elevation angle 604 that is an angle between the horizontal plane where the viewing target 610 resides and the viewpoint 601; and a viewing distance 605 between the viewpoint 601 and the viewing target 610.

Figure 7:
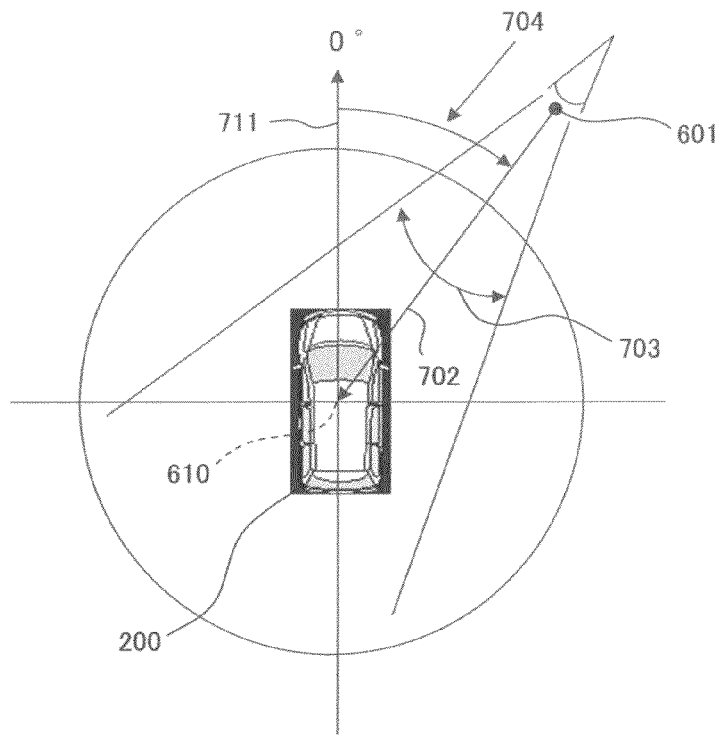
FIG. 7 illustrates viewing information with respect to a horizontal cross sectional plane.

FIG. 7 illustrates viewing information with respect to a horizontal plane.

The viewing information illustrated in FIG. 7 includes: a vertical angle of view 703 that indicates a given angle of the field of view around a view centerline 702 connecting a viewpoint 601 to a viewing target 610 in a horizontal plane when the vehicle 200 is observed from the viewpoint 601; and a clockwise horizontal angle 704 from the center line that extends forward from the center of the vehicle 200 to the viewpoint 601.

Figure 8:
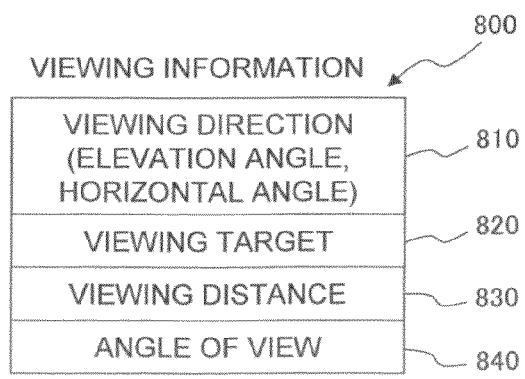
FIG. 8 illustrates a viewing information table.

FIG. 8 illustrates a viewing information table based on the viewing information of FIGS. 6 and 7.

A viewing information table 800 contains a viewing direction field 810, a viewing target field 820, a viewing distance field 830, and an angle-of-view field 840.

The viewing direction field 810 stores the information of viewing direction such as the elevation angle 604 illustrated in FIG. 6 and the horizontal angle 704 illustrated in FIG. 7.

The viewing target field 820 stores the information of the viewing target 610 at the center of the observation from the viewpoint 601, and the information can be expressed as the coordinate of the viewing target 610 relative to the projection surface stored in the projection surface geometry manager 120. In FIGS. 6 and 7, the viewing target 610 is the center point of the vehicle 200.

The viewing distance field 830 stores the viewing distance 605 between the viewpoint 601 and the viewing target 610 illustrated in FIG. 6.

The angle-of-view field 840 stores the vertical angle of view 603 of FIG. 6 and the horizontal angle of view 703 of FIG. 7. The vertical angle of view 603 may be equal to the horizontal angle of view 703, and in the case, a single value may be stored as an angle of view.

Determination of the coordinate of the viewing target 610, the viewing direction based on the elevation angle 604 and the horizontal angle 704, and the viewing distance 605 leads to the coordinate of the viewpoint 601 relative to the projection surface, which determines the viewing information including a viewpoint and a viewing direction.

Accordingly, the viewing information is transited by the viewing movement controller 130 based on the viewing information in the viewing information table 800, and thereby the start-point viewing information 501 and the end-point viewing information 502 stored in the viewing transition-regulation memory 500 can be expressed by the viewing information based on the viewing information table 800.

For example, the start-point viewing information 501 may include: the elevation angle 604 of 40 degrees and the horizontal angle 704 of 180 degrees (the viewing direction field 810); the coordinate of the viewing target 610 that is aligned with the center of the vehicle 200 on the projection surface (the viewing target field 820); the viewing distance 605 of 14 m (the viewing distance field 830); and the vertical angle of view 603 of 40 degrees and the horizontal angle of view 703 of 40 degrees (the angle-of-view field 840), and the end-point viewing information 502 may include the same information of the same values as those of the start-point viewing information 50 except the horizontal angle 704 of 540 degrees (the viewing direction field 810).

The viewing interpolation regulation stored in the viewing interpolation regulation 503 may be designed so that the difference between the value of the start-point viewing information 501 and the value of the end-point viewing information 502 is divided by 180, and the resulting viewing information is applied serially from the start-point viewing information 501 to the end-point viewing information 502 to alter the information therebetween.

The periodic rendering trigger generator 160 generates a trigger signal for periodic image conversion processing by the image converter 140, and the signal is generated at intervals that provide smooth transit of the viewing of the image data generated by the image converter 140. The periodic rendering trigger generator 160 may generate a trigger signal at intervals of 0.1 second for example.

The viewing movement controller 130 transits the viewing information based on the start-point viewing information 501, the end-point viewing information 502 and the viewing interpolation regulation 503 stored in the viewing transition-regulation memory 500, as described above, for the smooth movement of the viewpoint and the viewing direction corresponding to the viewpoint on the trajectory of viewing transition 410 illustrated in FIG. 4 for example. This realizes the smooth movement and the overall display of the image data around the vehicle 200.

(Image of Vehicle Profile)

The combination of the image of the vehicle 200 with the three-dimensional projection surface 400 defines the relationship between the vehicle 200 and the image data around the vehicle 200.

Figure 9:
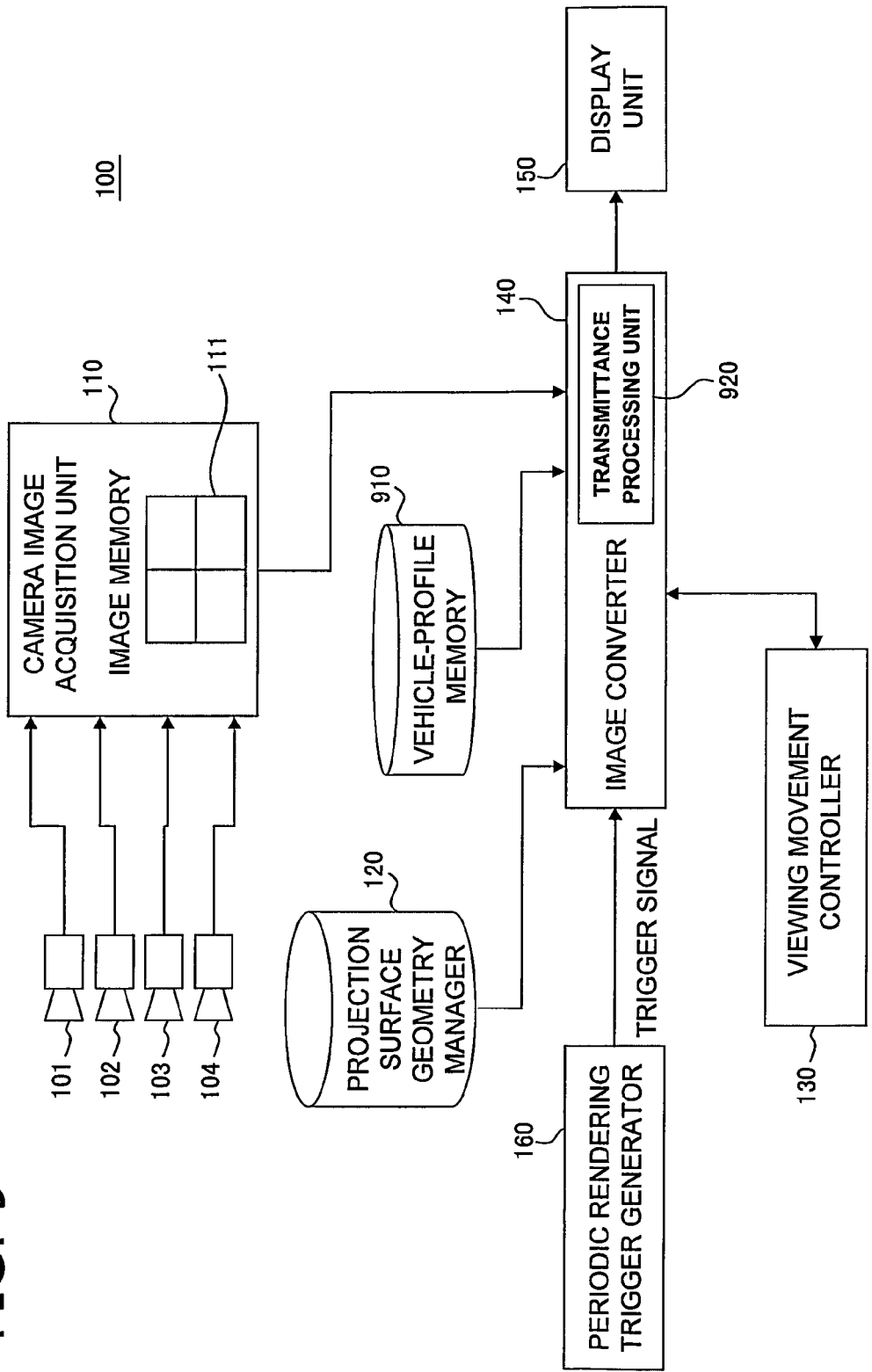
FIG. 9 is a block diagram illustrating an image processing apparatus.

FIG. 9 is a block diagram illustrating the image processing apparatus 100 that displays an image combined with the image of the vehicle 200.

In FIG. 9, the same elements as those of the image processing apparatus 100 in FIG. 1 are denoted by the same reference numerals as those in FIG. 1, which will not be described below.

The image processing apparatus 100 further includes a vehicle-profile memory 910.

The vehicle-profile memory 910 stores the three-dimensional profile information of the vehicle 200, and the information may include coordinate data and texture data of vehicle profile.

The image converter 140 projects the image data in the image memory 111 based on the projection surface geometry information in the projection surface geometry manager 120 to the projection surface, and combines the three-dimensional profile information of the vehicle in the vehicle-profile memory 910 with the projection surface. The image converter 140 converts the combined image data into a two-dimensional image based on the viewing information obtained from the viewing movement controller 130, and outputs the converted image to the display unit 150.

The image converter 140 further includes a transmittance processing unit 920. The transmittance processing unit 920 changes the manner to display the vehicle when the three-dimensional image of the vehicle is combined with the projected three-dimensional image on the projection surface, based on the three-dimensional profile information of the vehicle in the vehicle-profile memory 910, and displays the three-dimensional image of the vehicle with a higher transmittance by changing the transmittance of the image, or displays the three-dimensional image of the vehicle as wireframes.

(Image Conversion Process)

Figure 10:
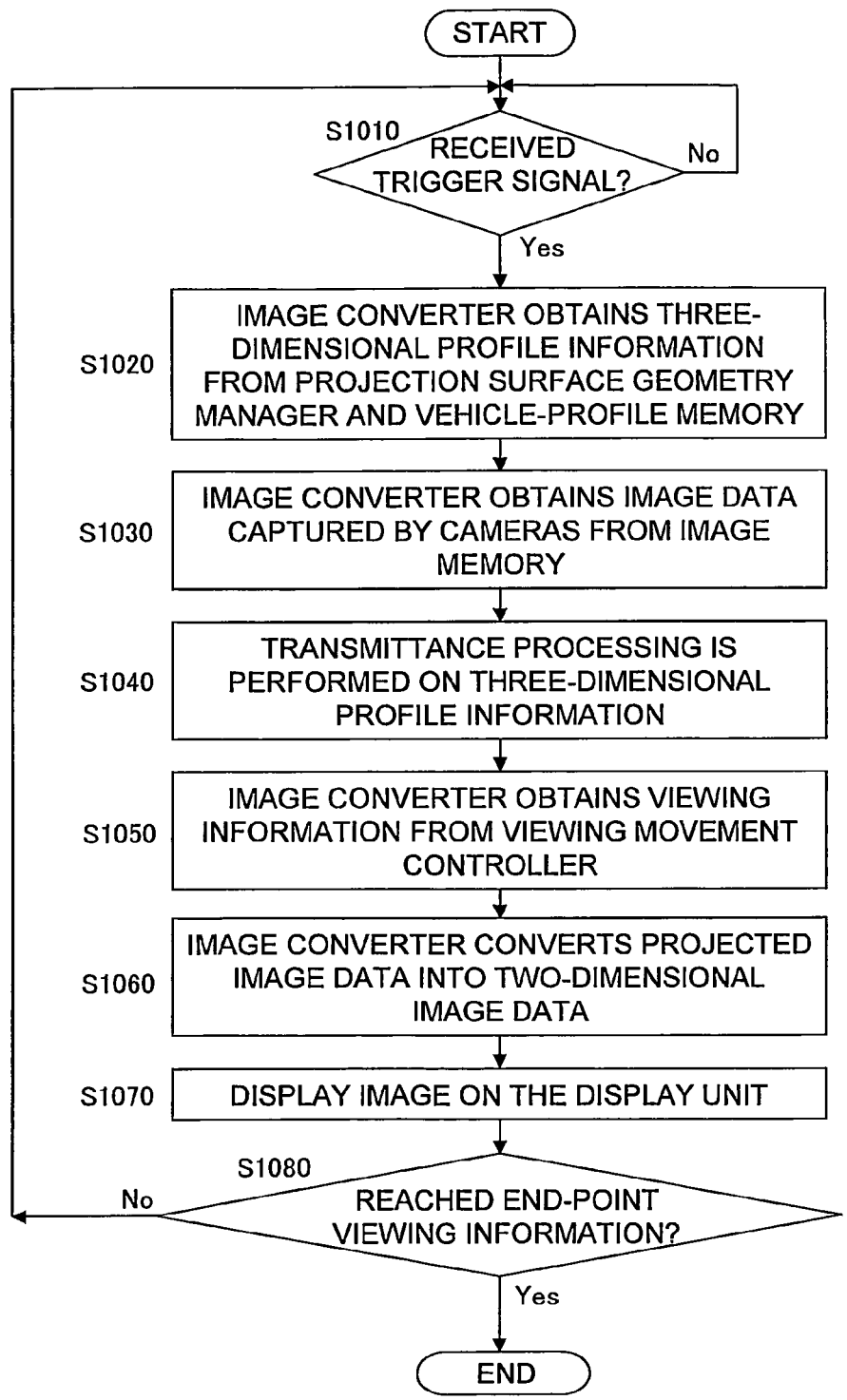
FIG. 10 is an operation chart of an image conversion process.

FIG. 10 is an operation chart of an image conversion process by the image processing apparatus 100. The image conversion process performed by the image converter 140 is focused on in the following description.

In operation S1010, the image converter 140 checks the receipt of a periodic trigger signal generated by the periodic rendering trigger generator 160. The image converter 140 waits for the receipt of a periodic trigger signal from the periodic rendering trigger generator 160, and after determining the receipt of a trigger signal, the image converter 140 proceeds to operation S1020.

In operation S1020, the image converter 140 obtains the projection surface geometry information from the projection surface geometry manager 120 and the three-dimensional profile information of the vehicle from the vehicle-profile memory 910.

In operation S1030, the image converter 140 obtains the image data captured by the cameras 101 to 104 and stored in the image memory 111, and combines each of the image data with the projection surface based on the projection surface geometry information from the projection surface geometry manager 120.

In operation S1040, the image converter 140 determines the transmittance of the three-dimensional profile information of the vehicle that is combined with the image data on the projection surface. The transmittance processing unit 920 in the image converter 140 determines the transmittance of the three-dimensional profile information of the vehicle within a range of from 0.0 (opaque) to 1.0 (transparent), and combines the resulting three-dimensional profile information with the three-dimensional projection image. The transmittance may have a default value of 0.5, for example, which can be changed based on the positional relationship between an obstacle and a vehicle or a command from an operator.

Figure 18:
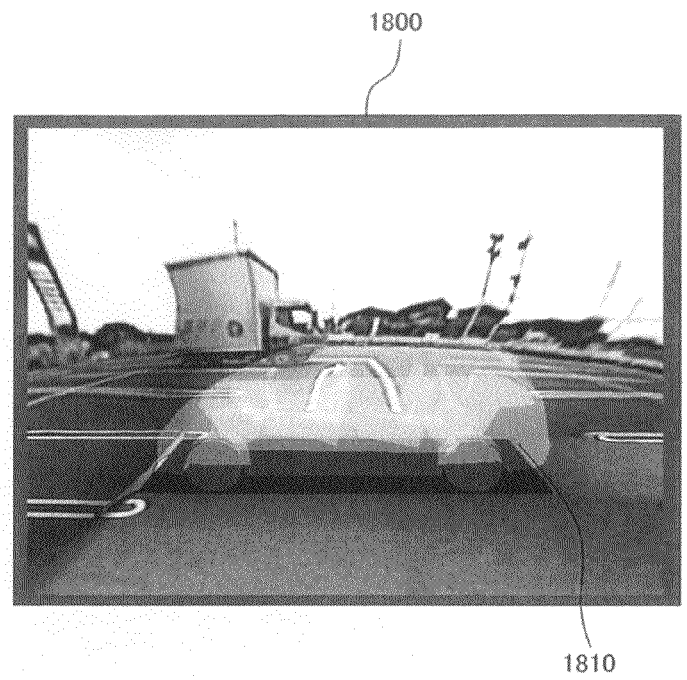
FIG. 18 illustrates a display of image data.

FIG. 18 illustrates image data in which the transmittance in the three-dimensional profile information of the vehicle 200 has a value for a translucent image (the transmittance is 0.5). The image data 1800 in FIG. 18 is created by combining the three-dimensional image data having the image data captured by the cameras 101 to 104 projected thereon with the three-dimensional vehicle profile information that is processed to have the transmittance of 0.5, on the projection surface 400 that is formed based on the projection surface geometry information stored in the projection surface geometry manager 120. In the three-dimensional profile information of the vehicle 200 displayed as an translucent image, objects beyond the vehicle 200 can be observed through the translucent vehicle 200, which enables the recognition of an obstacle for example in the image data 1800.

The three-dimensional profile information of a vehicle can be displayed as wireframes. In the case, the transmittance processing unit 920 creates three-dimensional mesh data with plural polygons based on the vehicle profile information of the vehicle 200 in the vehicle-profile memory 910, which is combined with the three-dimensional image data projected on the projection surface.

Figure 19:
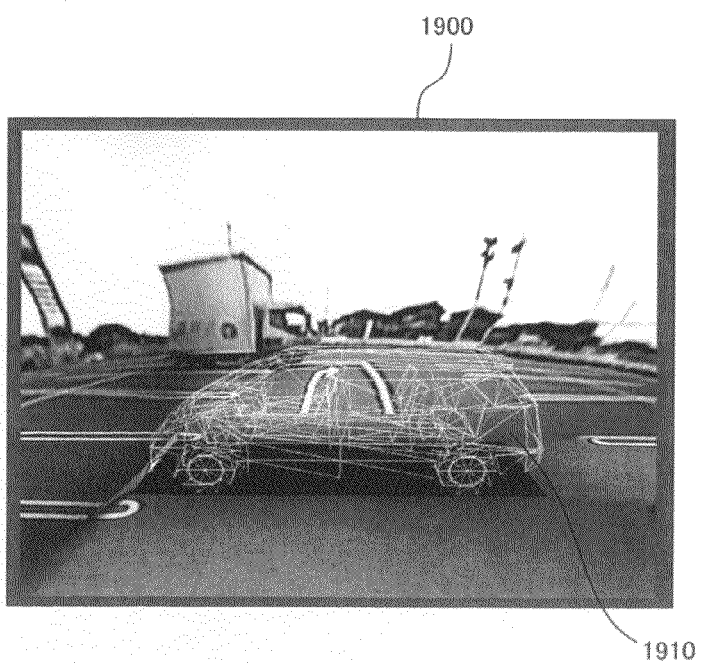
FIG. 19 illustrates a display of image data.

FIG. 19 illustrates image data in which the three-dimensional profile information of the vehicle 200 is displayed as wireframes. The image data 1900 in FIG. 19 is created by combining the three-dimensional image data having the image data captured by the cameras 101 to 104 projected thereon with the three-dimensional vehicle profile information as wireframes on the projection surface 400 that is formed based on the projection surface geometry information stored in the projection surface geometry manager 120. In the three-dimensional profile information of the vehicle 200 displayed as wireframes, objects beyond the vehicle 200 can be observed through the wireframes, which enables the recognition of an obstacle for example in the image data 1900.

In operation S1050, the image converter 140 transmits a request for viewing information to the viewing movement controller 130 to generate a two-dimensionally converted image, and obtains current viewing information from the viewing movement controller 130. The viewing movement controller 130, as described above, calculates the current viewing information on the trajectory of viewing transition 410 based on the viewing information 501, the end-point viewing information 502 and the viewing interpolation regulation 503 stored in the viewing transition-regulation memory 500, and transmits the calculated current viewing information to the image converter 140, and also stores the calculated information in the current viewing information 504.

In operation S1060, the image converter 140 converts the image data that is the combination of the image data projected on the projection surface and the vehicle profile information into two-dimensional image data based on the obtained viewing information.

In operation S1070, the image converter 140 outputs the converted two-dimensional image data to the display unit 150.

In operation S1080, the image converter 140 determines whether the viewing information reaches the end-point viewing information or not. In obtaining the viewing information from the viewing movement controller 130, if the viewing information is the end-point viewing information itself, the image converter 140 receives the notification of the reach, simultaneously. Upon the receipt of the notification from the viewing movement controller 130, the image converter 140 determines that the viewing information have reached the end-point viewing information, and ends the process. Otherwise, the process goes to operation S1010.

The image converter 140 may be a three-dimensional graphics library software such as OpenGL that operates on a computer system.

(Viewing Transition Control Process)

The viewing movement controller 130 generates current viewing information on the trajectory of viewing transition 410 in response to the request from the image converter 140, and transmits the current viewing information to the image converter 140.

Figure 11:
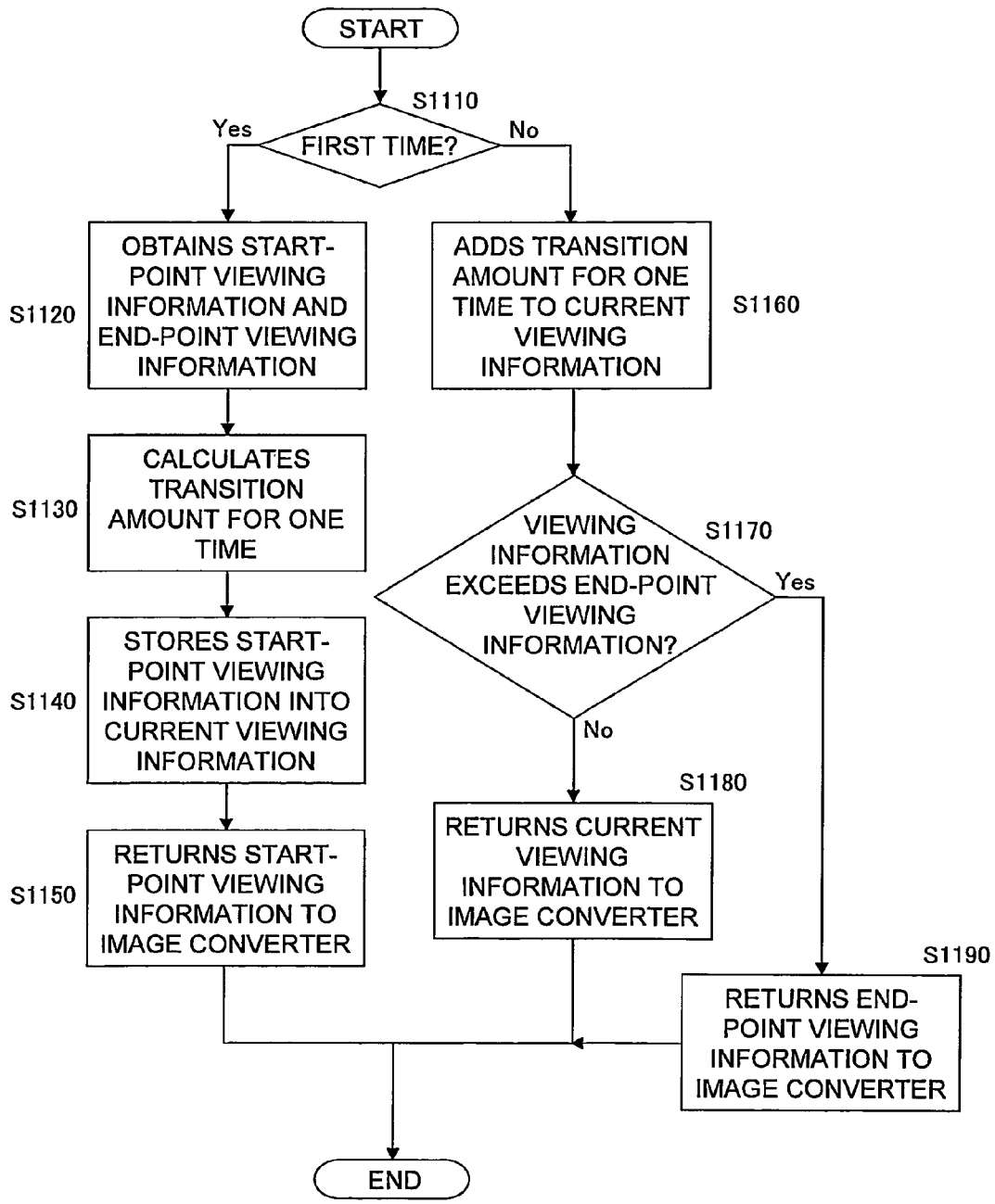
FIG. 11 is an operation chart of a viewing transition control process.

FIG. 11 is an operation chart of a viewing transition control process by the viewing movement controller 130.

In operation S1110, the viewing movement controller 130 determines whether the request for viewing information from the image converter 140 is the first one or not. If YES in operation S1110, the viewing movement controller 130 proceeds to operation S1120: if No, the viewing movement controller 130 proceeds to operation S1160.

In operation S1120, the viewing movement controller 130 reads the start-point viewing information 501 and the end-point viewing information 502 in the viewing transition-regulation memory 500.

In operation S1130, the viewing movement controller 130 calculates an amount of transition of the viewing information at one time based on the difference between the start-point viewing information 501 and the end-point viewing information 502. As described above, assume that the start-point viewing information 501 includes: the elevation angle 604 of 40 degrees and the horizontal angle 704 of 180 degrees (the viewing direction field 810); the coordinate of the viewing target 610 that is aligned with the center of the vehicle 200 on the projection surface (the viewing target field 820); the viewing distance 605 of 14 m (the viewing distance field 830); and the vertical angle of view 603 of 40 degrees and the horizontal angle of view 703 of 40 degrees (the angle-of-view field 840), and that the end-point viewing information 502 includes the same information of the same values as those of the start-point viewing information 50 except the horizontal angle 704 of 540 degrees (the viewing direction field 810). In the case, the only difference between the start-point viewing information 501 and the end-point viewing information 502 is the horizontal angle by 360 degrees.

For example, when the periodic rendering trigger generator 160 generates a trigger signal at intervals of 0.1 second, ten image data can be generated in one second, and an image entirely surrounding the vehicle 200 can be displayed in 18 seconds. This enables an image display in which the viewing continuously transits in a smooth manner. Thus, for the difference of the horizontal angle by 360 degrees between the start-point viewing information 501 and the end-point viewing information 502, the viewpoint is set to move by two degrees of the horizontal angle at one time, the angle being calculated by dividing 360 by 180.

In operation S1140, the viewing movement controller 130 stores the start-point viewing information 501 into the current viewing information 504.

In operation S1150, the viewing movement controller 130 transmits the start-point viewing information 501 to the image converter 140 as current viewing information 504.

In operation S1160, the viewing movement controller 130 adds the amount of transition for one time to the current viewing information 504.

In operation S1170, the viewing movement controller 130 determines whether the viewing information after the addition exceeds the end-point viewing information 502 or not. If NO in operation S1170, the viewing movement controller 130 proceeds to operation S1180: if YES, the viewing movement controller 130 proceeds to operation S1190.

In operation S1180, the viewing movement controller 130 stores the viewing information after the addition as the current viewing information 504, which is transmitted to the image converter 140.

In operation S1190, the viewing movement controller 130 transmits the end-point viewing information 502 as current viewing information to the image converter 140.

When the image conversion process is continued by the image converter 140 by repeating the transit of the viewing information, the viewing movement controller 130 may be configured to store the value of the start-point viewing information 501 as the current viewing information 504 in operation S1190.

(Determination of Minimum Elevation Angle Based on Blind Spot of Vehicle)

In the observation of the vehicle 200 from a current viewpoint, as the more portions are hidden behind the vehicle 200, the blind spots of the vehicle are increased. To decrease the blind spots, the elevation angle for a viewpoint may be narrowed. This however narrows the field of view within the angle of view. Accordingly, in determining the viewing information, a minimum value of an elevation angle is preferable determined so that the optimal balance of the blind spots and the field of view can be obtained.

Figure 12:
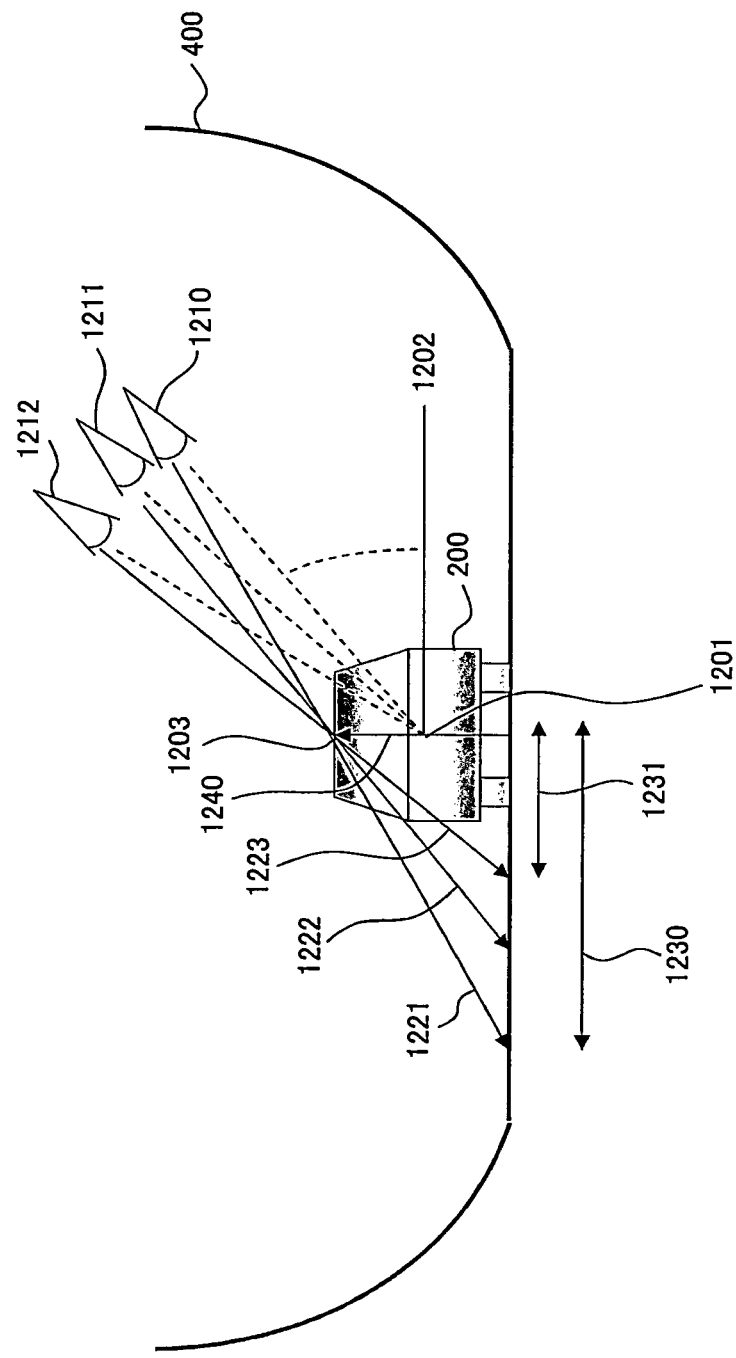
FIG. 12 illustrates determination of a minimum value of an elevation angle for a viewpoint.

FIG. 12 illustrates determination of a minimum value of an elevation angle for a viewpoint.

As illustrated in FIG. 12, the projection surface 400 is formed around the three-dimensional profile information of the vehicle 200.

Here, consideration is given to viewpoints 1210 to 1212 with the viewing target being aligned with the center point 1201 of the vehicle 200.

The elevation angle of the viewpoint 1210 relative to the horizontal plane 1202 that passes through the center point 1201 of the vehicle 200 is larger than that of the viewpoint 1211, and the elevation angle of the viewpoint 1211 is larger than that of the viewpoint 1212.

For simplicity of description, only the height 1240 of the vehicle 200 is taken in consideration, whereas the width of the vehicle 200 is neglected.

For the viewing direction from the viewpoint 1210 toward the center point 1201 of the vehicle 200, the blind spots reside within the area over the horizontal distance 1230 from the point that the extension 1221 of the line from the viewpoint 1210 through the top 1203 of the vehicle 200 crosses the horizontal plane of the projection surface 400 to the center point 1201 of the vehicle 200.

Similarly, for the viewing direction from the viewpoint 1212 toward the center point 1201 of the vehicle 200, the blind spots reside within the area over the horizontal distance 1231 from the point that the extension 1223 of the line from the viewpoint 1212 through the top 1203 of the vehicle 200 crosses the horizontal plane of the projection surface 400 to the center point 1201 of the vehicle 200.

The allowable range for the blind spots of the vehicle 200 is set based on the distance between the point that the extension of the line from the viewpoint through the top 1203 of the vehicle 200 crosses the horizontal plane of the projection surface 400 and the center point of the vehicle 200. The elevation angle for the viewpoint is determined based on the range, as the minimum elevation angle.

The viewing movement controller 130 sets the viewing information to be more than the determined minimum elevation angle, so that the range for blind spots of the vehicle 200 in the image data can be optimized.

(Determination of Minimum Elevation Angle Based on Projection Surface Geometry Information)

The image converter 140 forms a virtual three-dimensional projection surface 400 around the vehicle 200 corresponding to the projection surface geometry information in the projection surface geometry manager 120, and projects the image data captured by the cameras 101 to 104 onto the projection surface 400. When the image converter 140 converts the image on the projection surface 400 into two-dimensional image data, if the image includes a field of view outside of the projection surface 400, the converted two-dimensional image data may contain an area without image.

Figure 13:
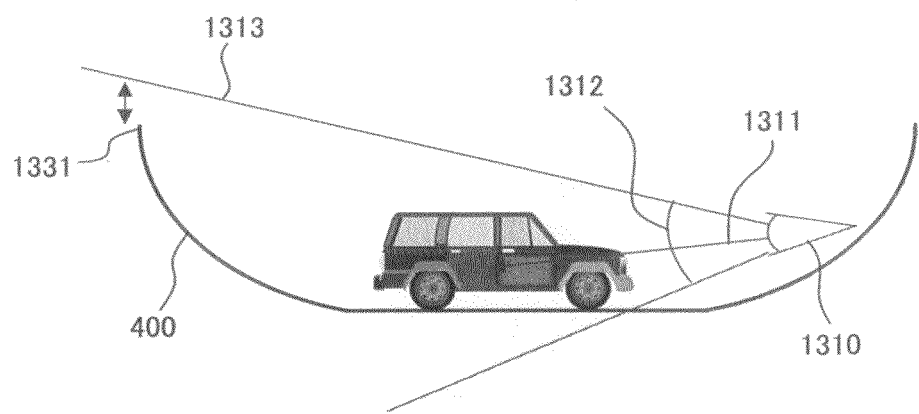
FIG. 13 illustrates a case where a field of view includes an area outside of a projection surface.

FIG. 13 illustrates a case where a field of view includes an area outside of a projection surface.

As illustrated in FIG. 13, the projection surface 400 is formed around the three-dimensional profile information of the vehicle 200.

In FIG. 13, the viewpoint 1310 has a center line 1311 in the viewing direction for observing the center point of the vehicle 200. The angle of view around the view centerline 1311 in the vertical direction is the angle of view 1312, the view centerline 1311 connecting the viewpoint 1310 to the center point of the vehicle 200.

In the illustrated example, in the observation of the center point of the vehicle 200 from the viewpoint 1310, the upper edge line 1313 of the field of view passes over the projection surface 400 above the upper edge 1331 thereof. Thus, the selection of the viewing direction at the elevation angle of the viewpoint 1310 in FIG. 13 results in the image data having an area without image data.

To eliminate the area, the elevation angle is increased so that the upper edge line 1313 of the field of view passes through the projection surface 400 below the upper edge 1331 thereof.

Figure 14:
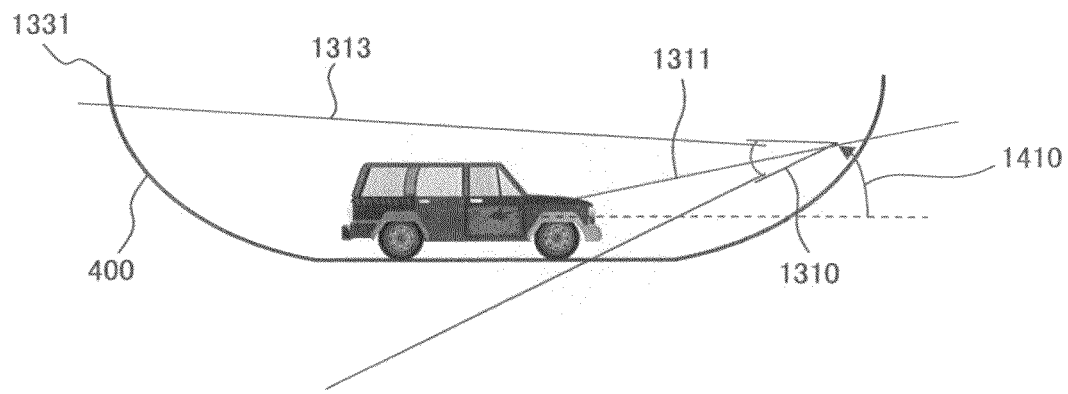
FIG. 14 illustrates a case where a field of view does not include the upper edge of a projection surface.

FIG. 14 illustrates a case where an elevation angle is increased so that a field of view does not include the upper edge of a projection surface.

The position of the viewpoint 1310 in FIG. 14 is higher than that of the viewpoint 1310 in FIG. 13 relative to the projection surface 400 in the vertical direction in the coordinate data. This allows the upper edge line 1313 of the field of view to pass below the upper edge 1331 of the projection surface 400, the field of view being determined by the angle of view in the vertical direction.

The resulting elevation angle 1410 is determined as the minimum elevation angle.

The viewing movement controller 130 sets the viewing information to be more than the determined minimum elevation angle, so that the images on the projection surface 400 can be converted into two-dimensional image data without an area that does not contain the image data of the projection surface 400.

(Determination of Minimum Elevation Angle Based on Range of Image Data)

When the image data captured by the cameras 101 to 104 is projected onto a projection surface, an area without image data may appear on the projection surface due to the errors in properties or variation in mount positions of the cameras 101 to 104. In this case also, the area without image data may appear near the upper edge of the projection surface 400.

Figure 15:
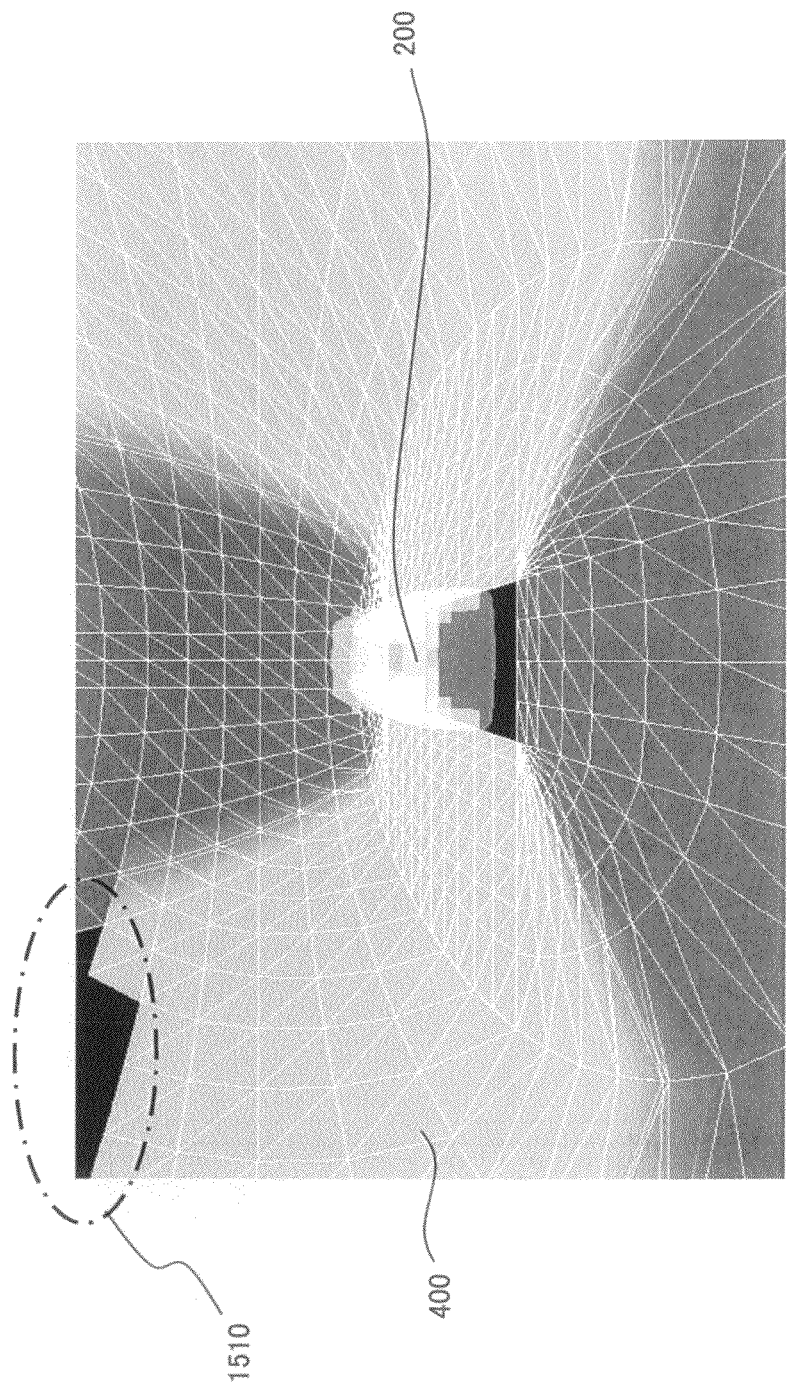
FIG. 15 illustrates a case where an area without image data appears on a projection surface.

FIG. 15 illustrates a case where an area without image data appears on a projection surface as the result of the projection of the image data captured by cameras to the projection surface.

As illustrated in FIG. 15, the projection surface 400 is formed around the three-dimensional profile information of the vehicle 200.

In this example, the area outside of an image range 1510 that does not contain image data appears on the upper left portion of FIG. 15.

The viewing movement controller 130 determines a minimum elevation angle so that such area outside of an image range 1510 is not converted into two-dimensional image data, and corrects the viewing information that is selected according to the viewing interpolation regulation 503 in the viewing transition-regulation memory 500, so that the area outside of an image range 1510 is not converted into two-dimensional image data.

Figure 16:
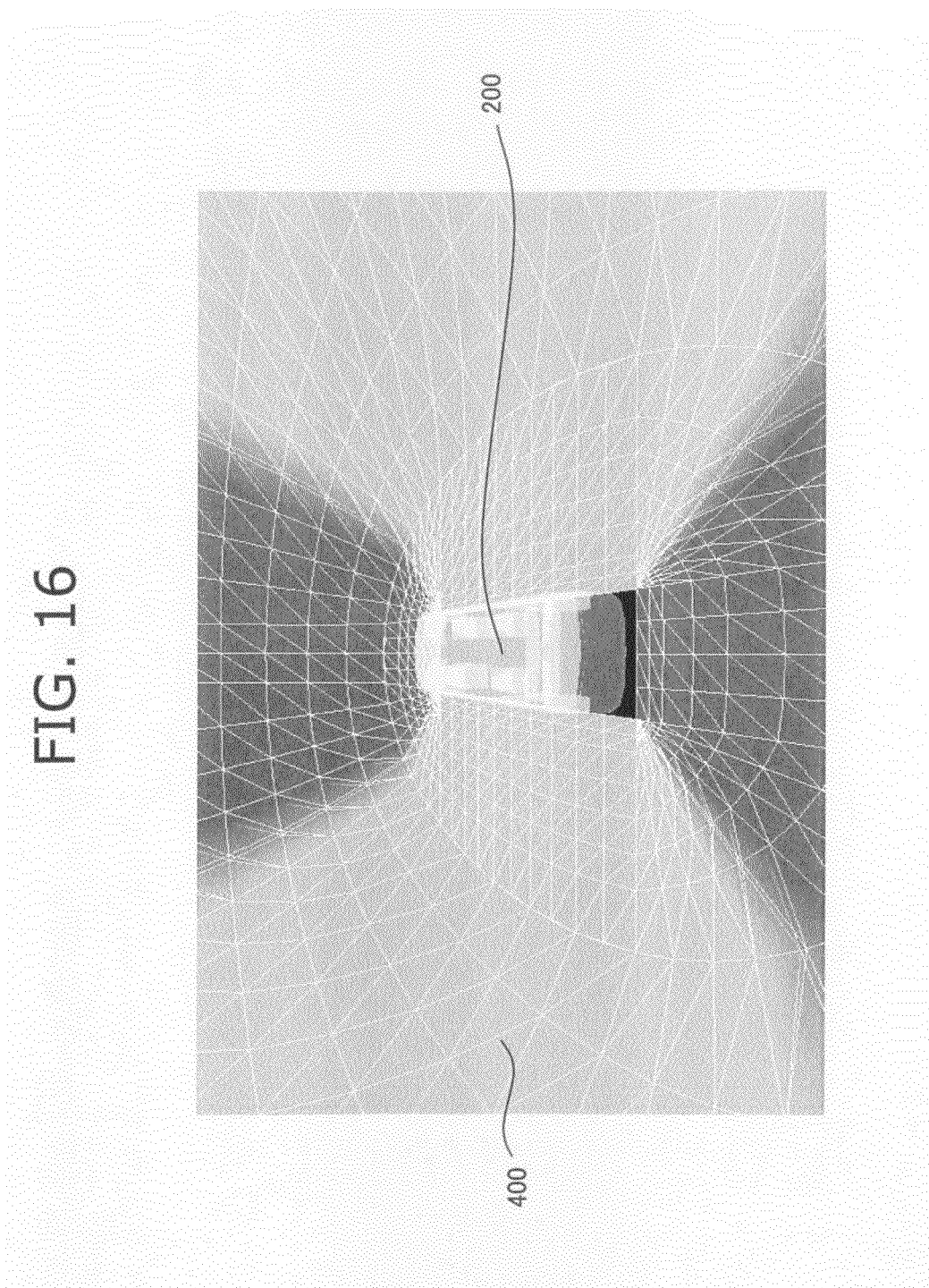
FIG. 16 illustrates viewing information that is corrected not to include the area outside of an image range.

FIG. 16 illustrates image data of the viewing information that is corrected not to include the area outside of an image range.

The viewing movement controller 130 corrects the viewing information so that the elevation angle exceeds the minimum elevation angle, when the viewing information selected according to the viewing interpolation regulation 503 contains the area outside of an image range 1510 such as that in FIG. 15. This alters the viewing information to have a larger elevation angle, and generates the image data without the area outside of an image range 1510 as illustrated in FIG. 16.

In addition to the elimination of the area outside of a projection surface from a field of view, the area outside of an image range 1510 due to the errors in properties or variation in mount positions of the cameras is also eliminated from the field of view, which prevents unnatural lack of an image in converted two-dimensional image data.

The cameras 101 to 104 are fixedly mounted to the vehicle 200, and each of the cameras 101 to 104 is considered to have property that does not exhibit a significant change in use. Accordingly, a minimum elevation angle at each horizontal angle may be determined by projecting the image data from the cameras 101 to 104 onto the projection surface 400, and rotating the horizontal angles of the viewing information 360 degrees over the upper edges to check the positions of the upper edges of image data.

Figure 17:
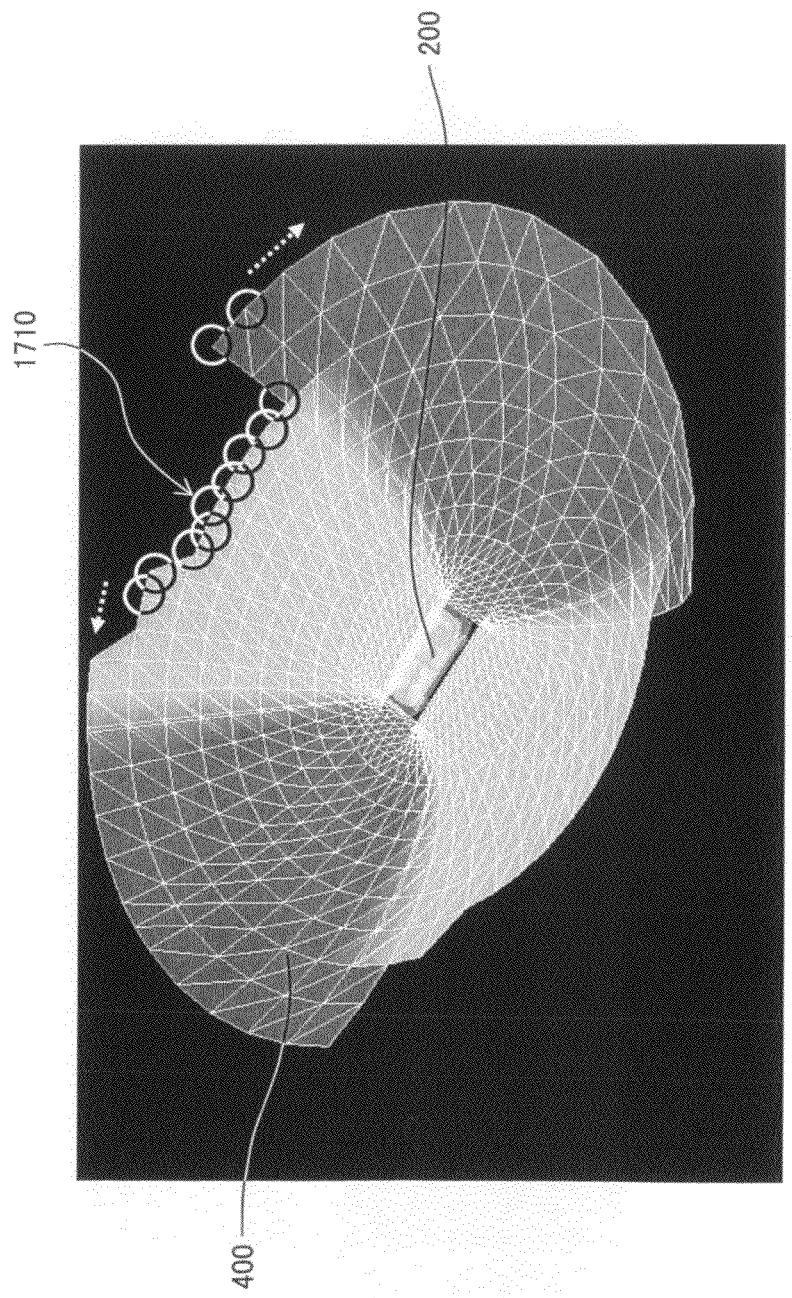
FIG. 17 illustrates determination of a minimum elevation angle for a horizontal angle.

FIG. 17 illustrates determination of a minimum elevation angle at each horizontal angle.

As shown in FIG. 17, the upper edges 1710 of the projected image data from the cameras 101 to 104 on the projection surface 400 have various heights, and when the viewing information with a constant elevation angle is applied to the image data, the areas outside of an image range may be converted into two-dimensional image data.

Thus, after the image data from the cameras 101 to 104 is projected onto the projection surface 400, the horizontal angles of the viewing information are rotated 360 degrees over the upper edges to determine a minimum elevation angle for each horizontal angle. In the selection of viewing information according to the viewing interpolation regulation 503 in the viewing transition-regulation memory 500, when determining the selected elevation angle is smaller than a minimum elevation angle based on the horizontal angle, the viewing movement controller 130 corrects the viewing information to set the elevation angle to be larger than the minimum elevation angle. This eliminates the area outside of an image range from the two-dimensional image data converted by the image converter 140, and prevents unnatural lack of image data.

(Start-Point Viewing Information)

Figure 20:
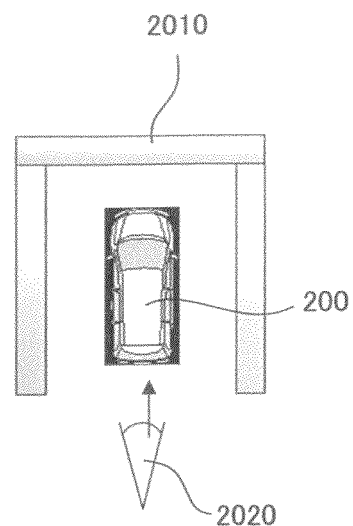
FIG. 20 illustrates a setting of start-point viewing information.
Figure 21:
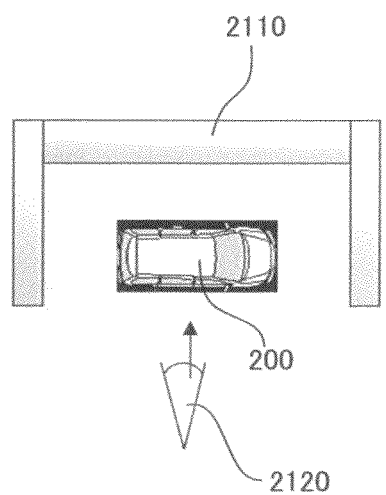
FIG. 21 illustrates a setting of start-point viewing information.

FIGS. 20 and 21 illustrate setting of start-point viewing information.

Assume that the vehicle 200 is parked with the front side thereof facing the wall of a parking space, and that the front wall and the side walls 2010 are the obstacles for the vehicle 200. The vehicle 200 is equipped with an obstacle sensor, and the front and side walls 2010 can be detected as obstacles by the sensor.

In the situation, the driver outside of the vehicle 200 sees the parking space (the viewing direction is upward in FIG. 20) from the open side thereof (from the lower side of the parking space in FIG. 20), and approaches the vehicle 200 to get in. Thus, the viewpoint and viewing direction in the start-point viewing information 501 can be set so that the scene a driver approaching the parking space can be reproduced with the viewpoint 2020 at the open side of the parking space and the viewing direction toward the inside of the parking space from the viewpoint 2020.

As illustrated in FIG. 21, the information can be set similarly in the case where the vehicle 200 is parked with one side thereof facing the open side of the parking space.

For example, for the detection of the walls that are the front and left side obstacles for the vehicle 200 by the obstacle sensor on the vehicle 200, the direction for observing the right side of the vehicle 200 from the viewpoint 2120 on the open side of the parking space is set as the start-point viewing information 501.

The above setting allows the driver who is in the vehicle 200 and checking the surroundings of the vehicle 200 to reproduce the scene the driver approaching the vehicle 200 from outside of the vehicle 200 and checking the surroundings of the vehicle 200 from inside of the vehicle 200. The display provides an image of the surroundings of the vehicle 200 that is easy for a driver to perceive, which contributes to the reliable safety check at the start of driving of the vehicle 200.

(Obstacle Monitoring)

Figure 22:
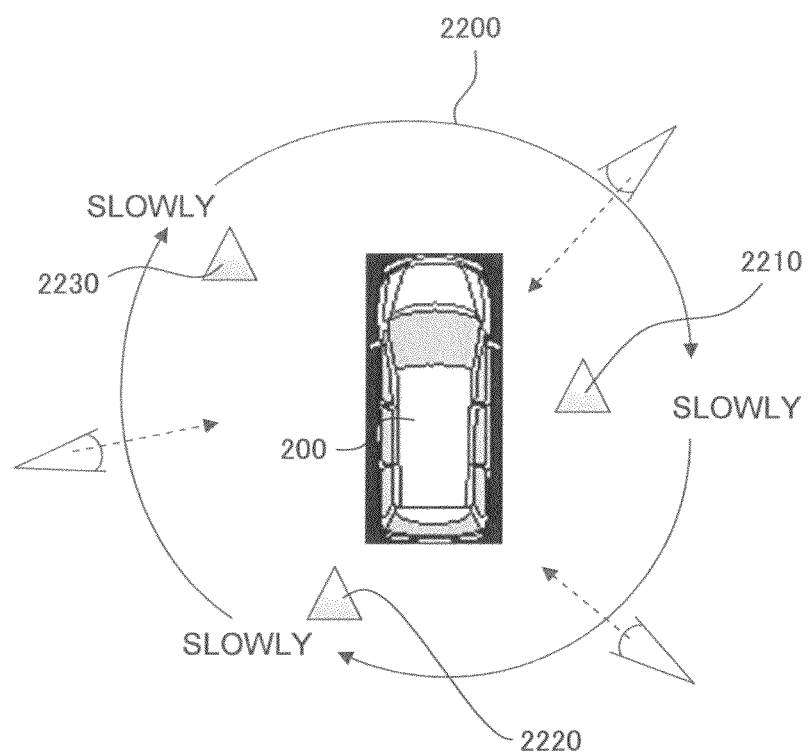
FIG. 22 illustrates a transition of viewing information when obstacles are detected around a vehicle.

FIG. 22 illustrates transition of viewing information when obstacles are detected around a vehicle.

The vehicle 200 is equipped with obstacle sensors on both sides of a front bumper and both sides of a rear bumper for example, to detect obstacles in all directions in the surroundings of the vehicle 200.

The viewing information transited by the viewing movement controller 130 is the viewing direction for observing the center point of the vehicle 200 from above the viewpoint 2200. The viewing movement controller 130 is configured to reduce the amount of transition of the viewing information when an obstacle is determined to be present within the field of view from a current viewpoint.

As illustrated in FIG. 21, the obstacle sensors of the vehicle 200 detect a first obstacle 2210 on the right side of the vehicle 200, a second obstacle 2220 on the left rear side of the vehicle 200, and a third obstacle 2230 on the left front side of the vehicle 200. The obstacle sensors have properties to detect the direction and distance of an obstacle relative to the center point of the vehicle 200.

When determining that the obstacles 2210, 2220 and 2230 are present within the angle of view according to the viewing information set by the viewing movement controller 130, the viewing movement controller 130 reduces the value of interpolation in the viewing interpolation regulation 503 stored in the viewing transition-regulation memory 500. For example, in the case where the viewing movement controller 130 transmits the viewing information including horizontal angle with two-degree increments to the image converter on every request for the viewing information from the image converter 140, when the obstacles 2210, 2220 and 2230 lie within the angle of view, the viewing movement controller 130 may transmit the viewing information including horizontal angle with one-degree increments.

This allows the viewing movement controller 130 to transit the viewing information as if the driver moves the eyes slowly around the positions where the obstacles are detected, which assures the recognition of the obstacles by the driver, and facilitates the identification of the obstacle by the driver.

Figure 23:
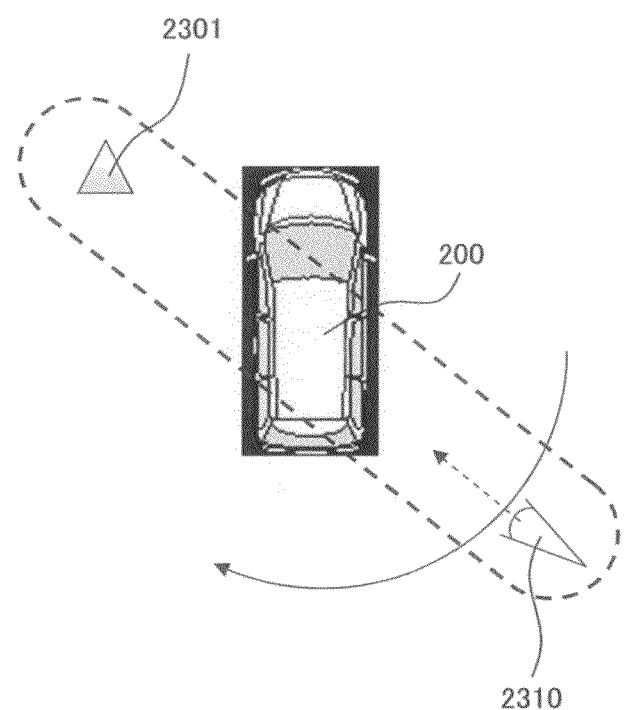
FIG. 23 illustrates a change in transmittance of a vehicle to increase the visibility of an obstacle.

FIG. 23 illustrates a change in transmittance of the vehicle 200 to increase the visibility of the obstacles around the vehicle 200.

In this case also, the vehicle 200 is equipped with obstacle sensors that can detect obstacles around the vehicle 200, and the direction and distance of the obstacle from the vehicle 200.

Based on the viewing information from the viewing movement controller 130, when determining that the vehicle 200 lies between an obstacle and the viewpoint, the image converter 140 causes the transmittance processing unit 920 to increase the transmittance for the display of three-dimensional profile information of the vehicle 200.

For example, as illustrated in FIG. 23, when the profile information of the vehicle 200 is interposed between the viewpoint 2310 and the obstacle 2301 detected by an obstacle sensor, the profile information of the vehicle 200 is displayed with a higher transmittance to be combined with the projected image data.

This increases the visibility of the image data of the obstacle contained in the image data projected on the projection surface 400 through the profile information of the vehicle 200 after the transmittance processing, which facilitates the recognition of the obstacle, as well as the identification including the size and shape of the obstacle.

Second Embodiment

Figure 24:
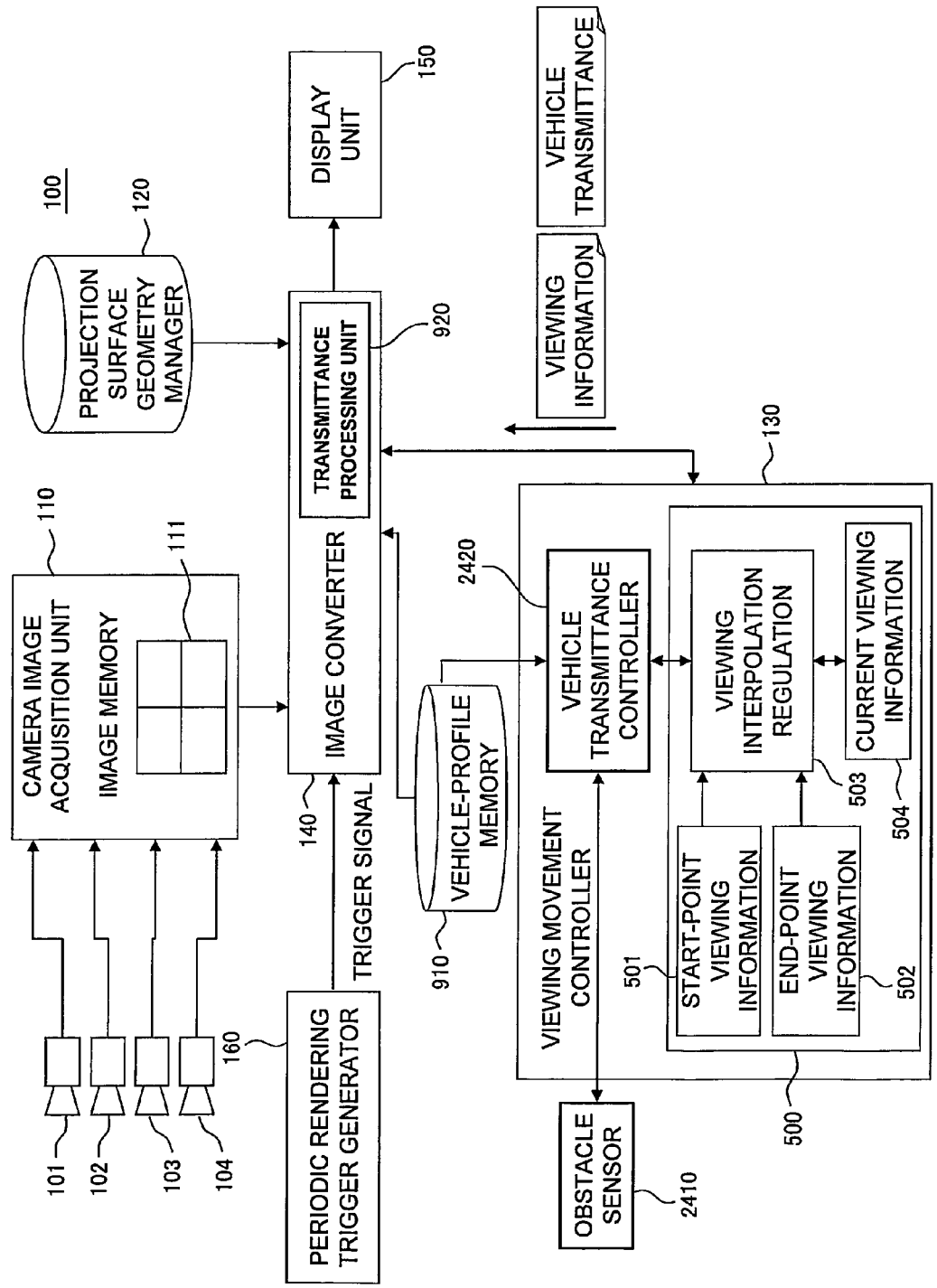
FIG. 24 is a functional block diagram illustrating an image processing apparatus of a second embodiment.

FIG. 24 is a functional block diagram illustrating an image processing apparatus of a second embodiment.

In FIG. 24, the same elements as those of the image processing apparatus 100 of the first embodiment are denoted by the same reference numerals as those of the first embodiment, which will not be described below.

The image processing apparatus 100 of the second embodiment is installed in the vehicle 200, and further includes obstacle sensor 2410 for detecting the direction and distance of an obstacle around the vehicle 200 from the vehicle 200, and a vehicle transmittance controller 2420 provided in the viewing movement controller 130.

The obstacle sensor 2410 is able to detect multiple obstacles in the surroundings of the vehicle 200, and may be sensor devices such as optical sensors and ultrasonic sensors that are assembled in the right and left sides of the front bumper and the rear bumper of the vehicle 200, for example.

Figure 25:
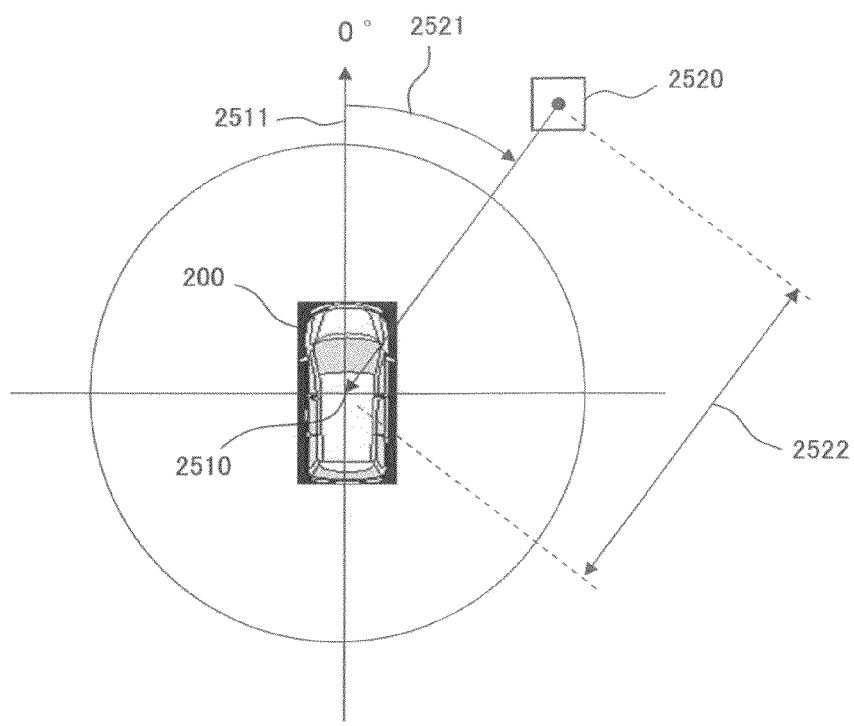
FIG. 25 illustrates obstacle information obtained by an obstacle sensor.

FIG. 25 illustrates obstacle information obtained by the obstacle sensors.

Here, as illustrated in FIG. 25, consideration is given to the case where an obstacle sensor on the vehicle 200 detects an obstacle 2520 in the right front direction of the vehicle 200.

The obstacle sensor 2410 detects the horizontal angle 2521 where the obstacle 2520 lies and the distance from the center point 2510 of the vehicle 200 to the obstacle 2520, by setting the center line 2521 at zero degrees, the center line 2521 extending from the center point 2510 of the vehicle 200 to the front side of the vehicle 200. The obstacle sensor 2410 detects an obstacle as a point that does not contain the information of the height thereof (elevation angle), which means the obstacle sensor 2410 only detects the horizontal angle and distance in an horizontal plane of the obstacle.

The obstacle information detected by the obstacle sensor 2410 is stored in a given memory area as an obstacle table.

Figure 26:
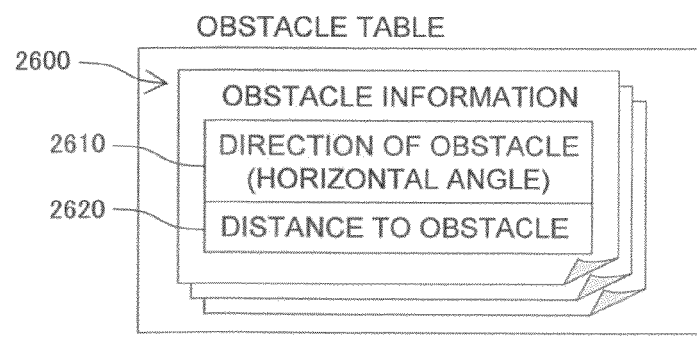
FIG. 26 illustrates an obstacle table.

FIG. 26 illustrates an example of the obstacle table.

The obstacle table 2600 contains the direction of an obstacle (horizontal angle) 2610 and the distance from the vehicle 200 to the obstacle 2620, and is stored in a given memory area as a record of the obstacle.

Figure 27:
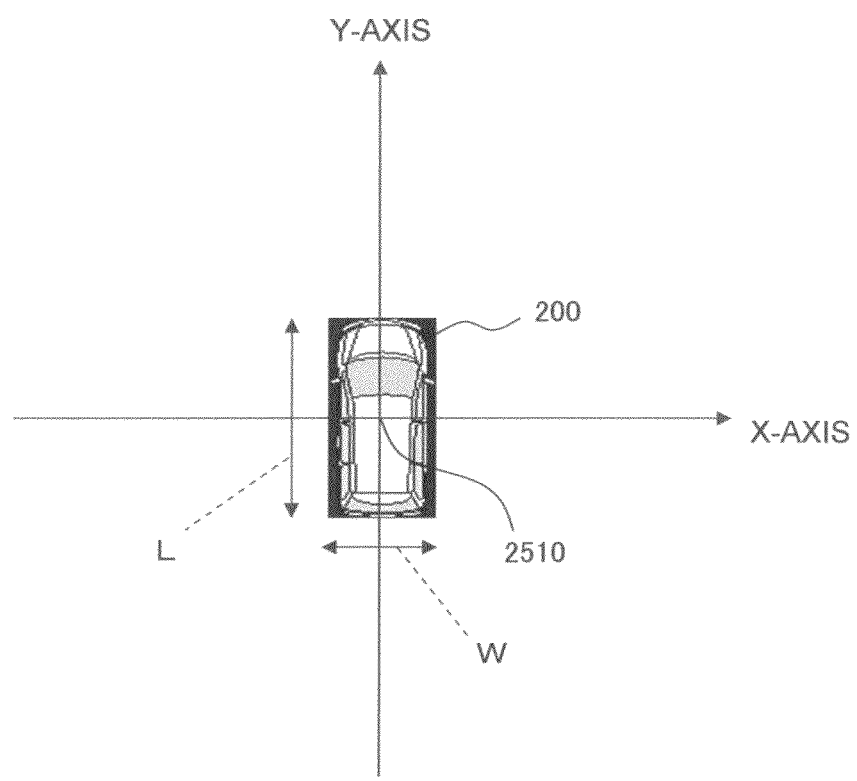
FIG. 27 illustrates a vehicle as viewed from above the vehicle.

FIG. 27 illustrates the vehicle 200 as viewed from above.

The vehicle 200 has a width W parallel to the X-axis and a length L parallel to the Y-axis when the lateral line from the center point 2510 of the vehicle 200 serves as the X-axis and the longitudinal line from the center point 2510 serves as the Y-axis. The width W and the length L are stored in the vehicle-profile memory 910 as a part of the vehicle profile information.

The viewing movement controller 130 determines viewing information based on the viewing transition-regulation memory 500 when received a request for the viewing information from the image converter 14, and also calculates the transmittance of the vehicle profile information based on the viewing information, the vehicle profile information in the vehicle-profile memory 910, and the obstacle information detected by the obstacle sensor 2410, and transmits the resulting viewing information and the transmittance to the image converter 140.

The image converter 140 combines the projection surface geometry in the projection surface geometry manager 120, the image data in the image memory 111, and the three-dimensional profile information of the vehicle 200 in the vehicle-profile memory 910, and the vehicle transmittance received from the viewing movement controller 130 to create three-dimensional image data, and converts the three-dimensional image data into two-dimensional image data based on the viewing information received from the viewing movement controller 130.

The vehicle transmittance controller 2420 calculates a shielded area behind the vehicle 200 as viewed from the current viewpoint, based on the current viewing information and the vehicle profile information. The calculation of shielded area by the vehicle transmittance controller 2420 is described below with reference to FIG. 28.

Figure 28:
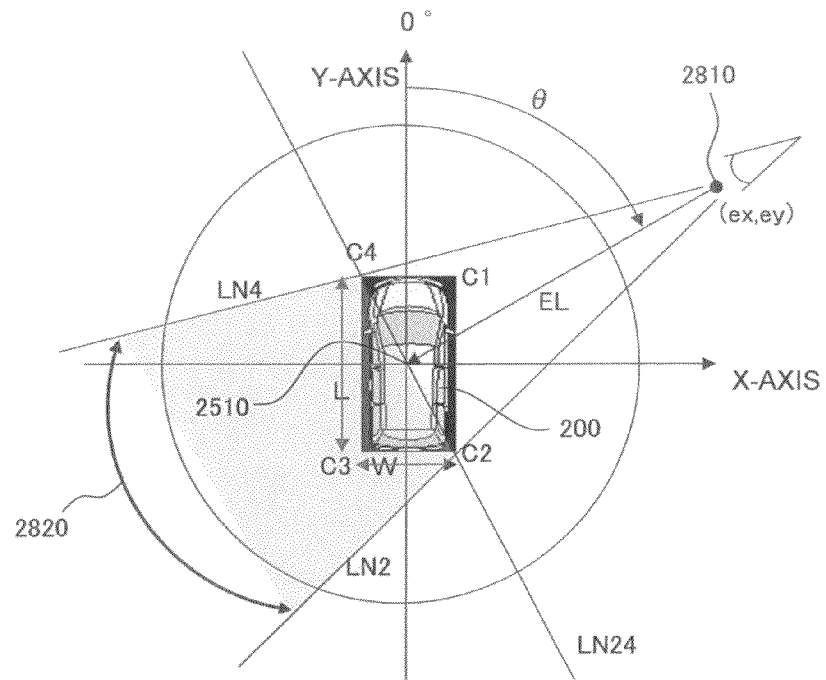
FIG. 28 illustrates a shielded area when a vehicle is observed from a given viewpoint.

FIG. 28 illustrates a shielded area when a vehicle is observed from a given viewpoint.

In FIG. 28, the viewpoint 2810 in a horizontal plane according to the current viewing information has a coordinate (ex, ey) in the X-Y coordinate system defined with the origin at the center point 2510 of the vehicle 200 which is the viewing target 820. From the viewpoint 2810, a viewing distance 830 extends to the center point 2510 of the vehicle 200 as a distance EL. The viewpoint 2810 has a horizontal angle θ from the Y-axis that extends from the center point 2510 of the vehicle 200 to the front side of the vehicle 200 (upward in FIG. 28).

The coordinate of the viewpoint 2810 (ex, ey) can be expressed as: ex=EL×cos (90°−θ) and ey=EL×sin (90°−θ).

The vehicle 200 have four corners: a right front corner C1 (W/2, L/2); a right rear corner C2 (W/2, −L/2); a left rear corner C3 (−W/2, −L/2); and a left front corner C4 (−W/2, L/2). The area between the extensions from the viewpoint 2810 through each of the corners C1 to C4 is the shielded angle range 2820. In FIG. 28, the shielded angle range 2820 is defined between the straight line LN2 extending from the viewpoint 2810 through the right rear corner C2 and the straight line LN4 extending from the viewpoint 2810 through the left front corner C4. The shielded area shielded by the vehicle profile information of the vehicle lies on the side of the straight line LN24 opposite to the viewpoint 2810, the straight line LN24 passing the right rear corner C2 and the left front corner C4.

The straight lines LN2 and LN4 that define the shielded angle range 2820 can be expressed in the following equations.

$$LN2: (ey+L/2) \times X - (ex-W/2) \times Y - ex \times L/2 - ey \times W/2 = 0$$

$$LN4: (ey-L/2) \times X - (ex+W/2) \times Y + ex \times L/2 + ey \times W/2 = 0$$

The vehicle transmittance controller 2420 determines whether the obstacle information obtained from the obstacle sensor 2410 is present within the shielded area or not in the coordinate space having the viewpoint 2810 therein. The determination of the presence is described below with reference to FIG. 29.

Figure 29:
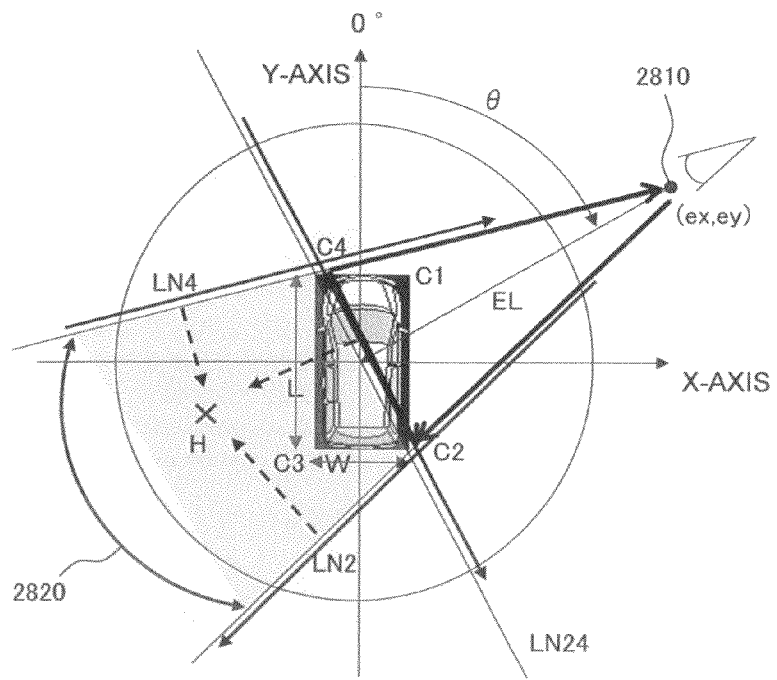
FIG. 29 illustrates the relationship between obstacle information and a shielded area.

FIG. 29 illustrates the relationship between obstacle information and a shielded area.

The vehicle transmittance controller 2420 determines the obstacle position H in the X-Y coordinate system based on the obstacle information from the obstacle sensor 2410.

The vehicle transmittance controller 2420 determines whether the obstacle position H is present within the shielded area or not based on the determined obstacle position H.

Each of the straight line LN2 from viewpoint 2810 through the right rear corner C2 of the vehicle 200, the straight line LN4 from viewpoint 2810 through the left front corner C4 of the vehicle 200, and the straight line LN24 passing through right rear corner C2 and the left front corner C4 of the vehicle 200 has a vector in a given direction.

Based on viewpoint 2810 as an origin E, the straight line LN2 has a first vector (E, C2) pointing from the viewpoint 2810 toward the right rear corner C2, the straight line LN4 has a second vector (C4, E) pointing from the left front corner C4 toward the viewpoint 2810, and the straight line LN24 has a third vector (C4, C2) pointing from the left front corner C4 toward the right rear corner C2.

If the obstacle position H resides on the right side of the vectors when seen in the pointing direction along each of the vectors, the obstacle position H is determined to be present within the shielded area of the vehicle 200 as seen from the viewpoint 2810. In other words, when the coordinate of each of the vectors is transformed to be aligned with the X-axis and point toward the positive direction, if the obstacle position H after the transformation has a negative coordinate, the obstacle position H is determined to be present on the right side of the vector.

The vehicle transmittance controller 2420 performs the above process on each of the first to third vectors. When the vehicle transmittance controller 2420 determines that the obstacle position H is present on the right side of each of the vectors, the obstacle position H is determined to be present within the shielded area of the vehicle 200.

When multiple obstacles sensors 2410 are installed in the vehicle 200, the vehicle transmittance controller 2420 transmits the request for obstacle information to each of the obstacle sensors 2410, and creates a obstacle table of obstacle information 2600 such as that illustrated in FIG. 26.

The vehicle transmittance controller 2420 determines whether each obstacle information in the obstacle table 2600 is present within the shielded area of the vehicle 200 or not. When determining the presence of at least one obstacle within the shielded area of the vehicle 200, the vehicle transmittance controller 2420 increases the transmittance of the vehicle 200 from the normal value: whereas when determining no presence, the vehicle transmittance controller 2420 transmits the normal vehicle transmittance to the image converter 140. The normal vehicle transmittance has a value of 0.5, and can be changed into 0.8 for the presence of an obstacle within the shielded area of the vehicle 200.

Figure 30:
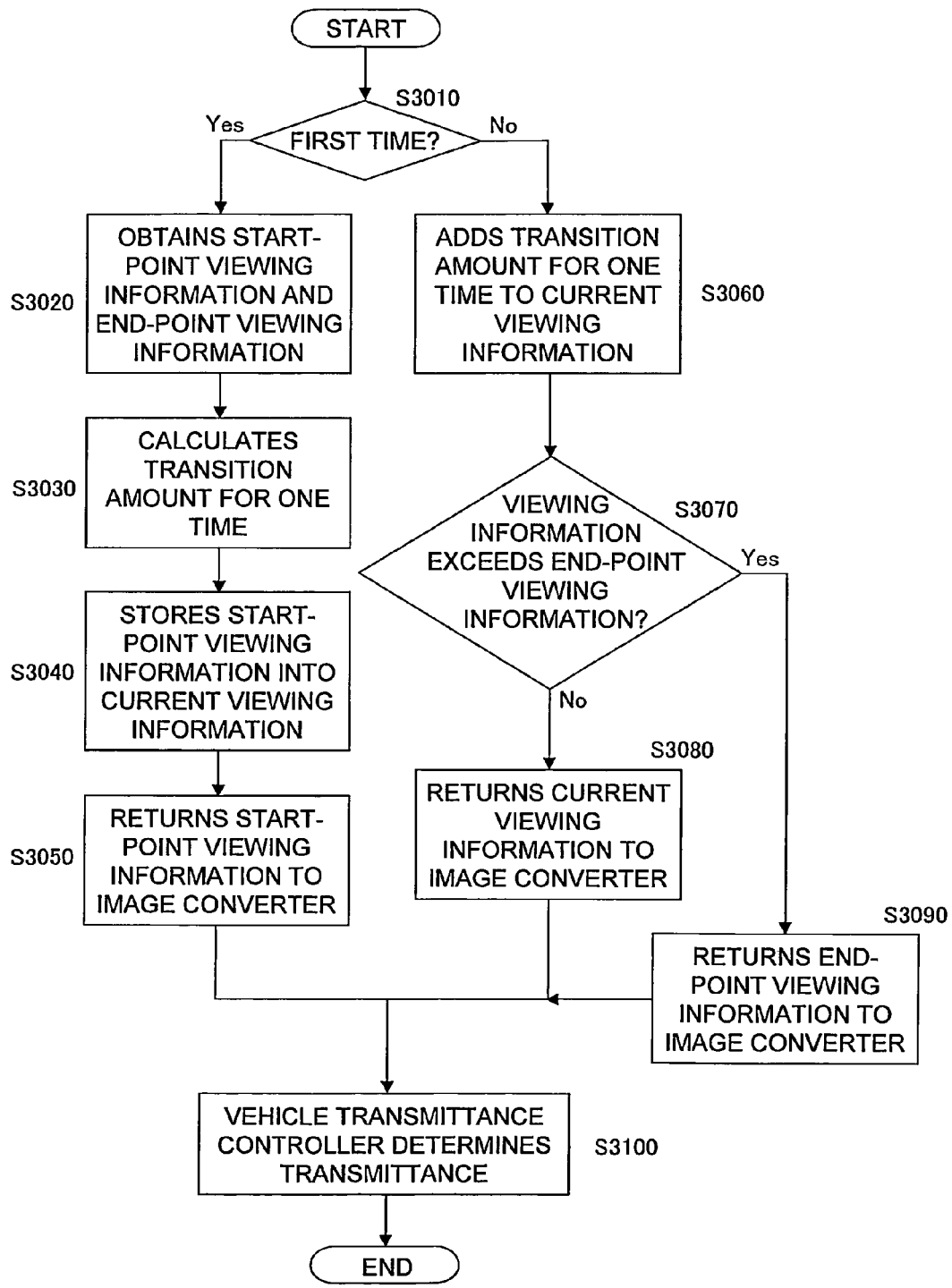
FIG. 30 is an operation chart of a viewing transition process.

FIG. 30 is an operation chart of a viewing transition process including the calculation of vehicle transmittance by the viewing movement controller. The process in the flowchart in FIG. 30, although similar to that for viewing transition in FIG. 11, is described below in order.

In operation S3010, the viewing movement controller 130 determines whether the request for viewing information from the image converter 140 is the first one or not. If YES in operation S3010, the viewing movement controller 130 proceeds to operation S3020: if No, the viewing movement controller 130 proceeds to operation S3060.

In operation S3020, the viewing movement controller 130 reads the start-point viewing information 501 and the end-point viewing information 502 from the viewing transition-regulation memory 500.

In operation S3030, the viewing movement controller 130 calculates an amount of transition of the viewing information at one time based on the difference between the start-point viewing information 501 and the end-point viewing information 502. The calculation is performed as described above.

In operation S3040, the viewing movement controller 130 stores the start-point viewing information 501 into the current viewing information 504.

In operation S3050, the viewing movement controller 130 transmits the start-point viewing information 501 as current viewing information to the image converter 140.

In operation S3060, the viewing movement controller 130 adds the amount of transition for one time to the current viewing information 504.

In operation S3070, the viewing movement controller 130 determines whether the viewing information after the addition exceeds the end-point viewing information 502 or not. If NO in operation S3070, the viewing movement controller 130 proceeds to operation S3080: if YES, the viewing movement controller 130 proceeds to operation S3090.

In operation S3080, the viewing movement controller 130 stores the viewing information after the addition as the current viewing information 504, which is transmitted to the image converter 140.

In operation S3090, the viewing movement controller 130 transmits the end-point viewing information 502 as current viewing information to the image converter 140.

In operation S3100, the vehicle transmittance controller 2420 determines whether an obstacle is present within the shielded area of the vehicle 200 or not, and determines a vehicle transmittance, which is sent to the image converter 140.

Figure 31:
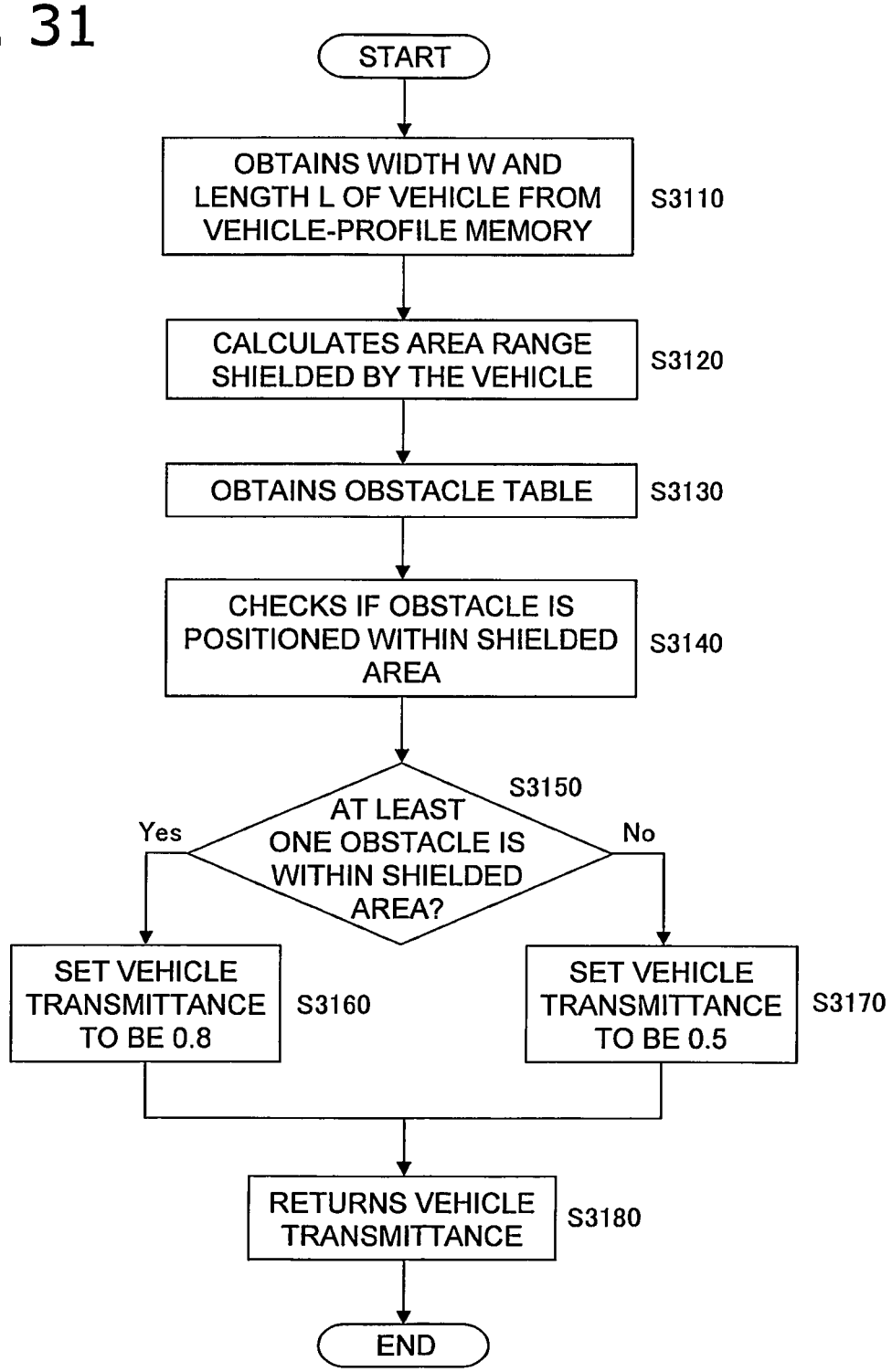
FIG. 31 is an operation chart of a vehicle transmittance determination process by a vehicle transmittance controller.

FIG. 31 is an operation chart of a vehicle transmittance determination process by the vehicle transmittance controller 2420.

The viewing movement controller 130 determines viewing information according to the viewing transition-regulation memory 500 when received a request for the viewing information from the image converter 14. The vehicle transmittance controller 2420 determines a vehicle transmittance based on the determined viewing information.

In operation S3110, the vehicle transmittance controller 2420, after the receipt of the current viewing information, reads the width W and the length L of the vehicle 200 stored in the vehicle-profile memory 910.

In operation S3120, the vehicle transmittance controller 2420 calculates the shielded area shielded by the vehicle 200. The calculation is performed using the equation for the lines between a viewpoint and the corners of the vehicle 200, which defines the shielded angle range 2820.

In operation S3130, the vehicle transmittance controller 2420 obtains obstacle information of one or multiple obstacles from the obstacle table 2600 that is created based on the obstacle information from the obstacle sensor 2410.

In operation S3140, the vehicle transmittance controller 2420 examines the obtained obstacle information by determining if the position of the obstacle is present within the shielded area of the vehicle 200.

As described above, the presence of the obstacle within the shielded area of the vehicle 200 can be determined based on the relationship between the vectors on the lines between the viewpoint and the corners of the vehicle 200 and the position of the obstacle. Alternatively, the presence can be determined based on the position of the obstacle in the X-Y coordinate system. The presence, however, may be determined by any other methods.

When there are multiple obstacles, each of the obstacles is determined whether present within the shielded area of the vehicle 200 or not.

In operation S3150, the vehicle transmittance controller 2420 determines whether there is at least one obstacle within the shielded area of the vehicle 200. If YES in operation S3150, the vehicle transmittance controller 2420 proceeds to operation S3160; if NO in operation S3150, the vehicle transmittance controller 2420 proceeds to operation S3170.

In operation S3160, the vehicle transmittance controller 2420 increases the vehicle transmittance from the normal value. For example, the transmittance can be increased to 0.8 from the normal value of 0.5.

In operation S3170, the vehicle transmittance controller 2420 uses the vehicle transmittance of the normal value. When the normal transmittance is 0.5, the vehicle transmittance controller 2420 selects the value.

In operation S3180, the vehicle transmittance controller 2420 transmits the selected vehicle transmittance to the image converter 140.

The image converter 140 changes the transmittance included in the vehicle profile information in the vehicle-profile memory 910 based on the vehicle transmittance from the viewing movement controller 130, and creates a combined image using the projection surface geometry information in the projection surface geometry manager 120 and the image data in the image memory 111, and converts the combined data into two-dimensional image data based on the viewing information from the viewing movement controller 130.

As described above, when an obstacle is present within the shielded area of the vehicle 200, the transmittance in the vehicle profile information that is combined with the image data is increased. This facilitates the recognition of the obstacle, assures the recognition of the obstacle by the driver, and prevents contact of the vehicle with the obstacle.

Other Embodiment (Directional Information from GPS)
A GPS (Global Positioning System) receiver on the vehicle may be used to change start-point viewing information by obtaining the positional and directional information of the vehicle and time data via the radio waves from satellites, and determining the current direction of the sunlight and the current running direction of the vehicle.

For example, when received a request for viewing information from the image converter 140, the viewing movement controller 130 determines the direction of the sunlight and the running direction of the vehicle 200 based on the directional information and time data from the GPS receiver.

When determining that the start-point viewing information 501 has a horizontal angle of about 180 degrees relative to the direction of the sunlight, the viewing movement controller 130 changes the start-point viewing information 501 to be parallel to or generally parallel to the direction of the sunlight.

The image data from the cameras 101 to 104 are combined to be projected on the projection surface. If the viewing direction to the projection surface has a horizontal angle of about 180 degrees relative to the direction of the sunlight, the projected image cannot be clearly seen by a driver due to the direct sunlight. Thus, the directions of the vehicle 200 and the sunlight are determined using the radio waves received at the GPS receiver, so that the transition of the viewing information is started from a viewpoint where a driver can see the image data easily, which facilitates the recognition of the surroundings of the vehicle by the driver.

(Determination of Position of Driver's Seat)

The information of a driver's seat indicating that the driver's seat is on the right or left side of a vehicle may be stored in a given memory area, so that the transition of viewing information may be started from the image data on the opposite side of a driver's seat of the vehicle.

The blind spot is likely to be on the opposite side of the driver's seat. Thus, the opposite side of the driver's seat is stored as the area where a blind spot often exists in the start-point viewing information 501. This facilitates the recognition of an obstacle.

(Transition of Viewing Information)

The viewing information may be set to display the overall surroundings from the driver's seat. In the case, the viewpoint at the driver's seat is set as the start-point viewing information 501, so that the viewing information can be transited from the front side, the right side, the back side, the left side, and the front side again with respect to the driver's seat.

The end-point viewing information may be set at the position outside of the vehicle. In the case, the viewing interpolation regulation 503 can be set so that the viewing information can be continuously transited in a smooth manner from start-point viewing information 501 that is the driver's viewpoint at the driver's seat to the end-point viewing information 502 at a given position outside of the vehicle 200.

The continuous and smooth transition of the viewing information allows the driver to check the surroundings of the vehicle 200 without discomfort.

Alternatively, the end-point viewing information 502 may be a viewpoint right above the vehicle 200 for looking down the vehicle 200 below.

This setting supports the driver's operation at the parking of the vehicle into a parking space and the starting of the vehicle from the parking space.

(Trigger to Start Image Processing)

The above described image processing for combining and displaying image data around the vehicle 200 with the viewing information being transited can be actuated by the operation of a switch provided to the processor by a driver.

When the vehicle 200 is provided with a car navigation system, the periodic rendering trigger generator 160 may generates a trigger signal after receiving an actuation signal of the car navigation system from an actuation signal receiver that is provided to receive the actuation signal of the car navigation system.

Alternatively, the periodic rendering trigger generator 160 may generate a trigger signal after receiving a starting signal of the engine of the vehicle from a starting signal receiver that is provided to receive the starting signal indicating the starting of the engine.

The present invention is applicable to an in-vehicle image processing apparatus that provides a monitor screen that can be seen from a driver's seat, and can be used as a vehicle surrounding monitoring system for monitoring the surroundings of the vehicle, and facilitates for a driver to perceive the situation of the vehicle and the surrounding of the vehicle from an observation viewpoint inside or outside of the vehicle.

The present invention achieves monitoring of the surroundings of a vehicle in various direction in addition to the vicinity of the vehicle based on the continuous transition of viewpoint and viewing direction, and enables an earlier detection of an object that is approaching to the vehicle.

What is claimed is:

1. An in-vehicle image processing apparatus capable of being linked to multiple cameras mounted to a vehicle, the image processing apparatus comprising:
   an image memory that stores multiple image data captured by each of the multiple cameras;
   a camera-image acquisition unit that inputs and stores the multiple image data captured by each of the cameras into the image memory;
   a projection surface geometry manager that manages projection surface geometry information including a set of three-dimensional coordinates for a projection surface that is virtually formed to surround the vehicle;
   a viewing movement controller that determines viewing information so that a viewpoint and a viewing direction relative to the projection surface are continuously transited according to given viewing transition regulations;
   an image converter that projects and combines each of the image data stored in the image memory on the projection surface, and converts the combined image data into two-dimensional image data based on the viewing information determined by the viewing movement controller;
   a display unit that displays the two-dimensional image data converted by the image converter;
   a periodic rendering trigger generator that generates a trigger signal to make the image converter start an image conversion process;
   a vehicle-profile memory that stores the three-dimensional profile information of the vehicle; and
   a minimum elevation angle memory that determines and stores a minimum elevation angle for viewing so that a range of the image data shielded by the three-dimensional profile information of the vehicle has a given distance or less, when the three-dimensional profile information of the vehicle is combined with each of the image data projected on the projection surface, wherein
   the image converter reads the three-dimensional profile information of the vehicle from the vehicle-profile memory, combines the three-dimensional profile information of the vehicle with each of the image data projected to the projection surface, and converts the combined image data into two-dimensional image data, and
   the viewing movement controller corrects the viewing information based on the minimum elevation angle for viewing stored in the minimum elevation angle memory.

2. An in-vehicle image processing apparatus capable of being linked to multiple cameras mounted to a vehicle, the image processing apparatus comprising:
   an image memory that stores multiple image data captured by each of the multiple cameras;
   a camera-image acquisition unit that inputs and stores the multiple image data captured by each of the cameras into the image memory;
   a projection surface geometry manager that manages projection surface geometry information including a set of three-dimensional coordinates for a projection surface that is virtually formed to surround the vehicle;
   a viewing movement controller that determines viewing information so that a viewpoint and a viewing direction relative to the projection surface are continuously transited according to given viewing transition regulations;
   an image converter that projects and combines each of the image data stored in the image memory on the projection surface, and converts the combined image data into two-dimensional image data based on the viewing information determined by the viewing movement controller;

a display unit that displays the two-dimensional image data converted by the image converter;

a periodic rendering trigger generator that generates a trigger signal to make the image converter start an image conversion process; and a viewing transition-regulation memory that stores the viewing transition regulations, wherein the viewing transition regulations stored in the viewing transition-regulation memory include start-point viewing information, end-point viewing information and viewing interpolation regulations, the viewing movement controller continuously changes the viewing information based on the start-point viewing information, the end-point viewing information, and the viewing interpolation regulations in the viewing transition-regulation memory, and the viewing interpolation regulations stored in the viewing transition-regulation memory continuously increases a transition speed for a given period of time after the transition of viewing information is started from the start-point viewing information, and continuously decreases the transition speed for a given period of time before the transition of viewing information is stopped at the end-point viewing information.

3. The image processing apparatus according to claim 2, wherein the vehicle is further provided with an obstacle sensor that is capable to link to the image processing apparatus and detects obstacle information including at least a position an obstacle exists, and the viewing movement controller receives the obstacle information, determines whether an obstacle is present on two-dimensional image data to be converted or not, and reduces the interpolation width in the viewing interpolation regulation to decrease the transition speed of viewing information when determining that an obstacle is present on the two-dimensional image data.

4. The image processing apparatus according to claim 2, further comprising:

a field-of-view-range detector that detects a range of two-dimensional image data converted by the image converter that is included in the projection surface, wherein the field-of-view-range detector determines whether the two-dimensional image data converted by the image converter covers the overall directions at the time when the viewing information transited by the viewing movement controller reaches the end-point viewing information, and when determining that the overall directions are not covered, changes the end-point viewing information.

5. An image processing method for in-vehicle image processing apparatus capable of being linked to multiple cameras mounted to a vehicle, the method comprising:

storing multiple image data captured by each of the multiple cameras;

inputting and storing the multiple image data captured by each of the cameras into the image memory;

managing projection surface geometry information including a set of three-dimensional coordinates for a projection surface that is virtually formed to surround the vehicle;

determining viewing information so that a viewpoint and a viewing direction relative to the projection surface are continuously transited according to given viewing transition regulations;

projecting and combining each of the stored image data on the projection surface, and converting the combined image data into two-dimensional image data based on the determined viewing information;

displaying the converted two-dimensional image data;

generating a trigger signal to make the converting start an image conversion process;

storing the three-dimensional profile information of the vehicle; and determining and storing a minimum elevation angle for viewing so that a range of the image data shielded by the three-dimensional profile information of the vehicle has a given distance or less, when the three-dimensional profile information of the vehicle is combined with each of the image data projected on the projection surface, wherein the converting includes reading the stored three-dimensional profile information of the vehicle, combining the three-dimensional profile information of the vehicle with each of the image data projected to the projection surface, and converting the combined image data into two-dimensional image data, and the determining viewing information includes correcting the viewing information based on the stored minimum elevation angle for viewing.

6. An image processing method for in-vehicle image processing apparatus capable of being linked to multiple cameras mounted to a vehicle, the method comprising:

storing multiple image data captured by each of the multiple cameras;

inputting and storing the multiple image data captured by each of the cameras into the image memory;

managing projection surface geometry information including a set of three-dimensional coordinates for a projection surface that is virtually formed to surround the vehicle;

determining viewing information so that a viewpoint and a viewing direction relative to the projection surface are continuously transited according to given viewing transition regulations;

projecting and combining each of the stored image data on the projection surface, and converting the combined image data into two-dimensional image data based on the determined viewing information;

displaying the converted two-dimensional image data;

generating a trigger signal to make the converting start an image conversion process; and storing the viewing transition regulations, wherein the stored viewing transition regulations include start-point viewing information, end-point viewing information and viewing interpolation regulations, the determining viewing information includes continuously changing the viewing information based on the start-point viewing information, the end-point viewing information, and the viewing interpolation regulations, and the stored viewing interpolation regulations stored in the viewing transition-regulation memory continuously increase a transition speed for a given period of time after the transition of viewing information is started from the start-point viewing information, and continuously decrease the transition speed for a given period of time before the transition of viewing information is stopped at the end-point viewing information.

7. The image method according to claim 6, further comprising:

detecting obstacle information including at least a position an obstacle exists; and receiving the obstacle information, determining whether an obstacle is present on two-dimensional image data to be converted or not, and reducing the interpolation width in the viewing interpolation regulation to decrease the transition speed of viewing information when determining that an obstacle is present on the two-dimensional image data.

8. The image method according to claim 6, further comprising:

detecting a range of the converted two-dimensional image data that is included in the projection surface;

determining whether the converted two-dimensional image data covers the overall directions at the time when the transited viewing information reaches the end-point viewing information, and when determining that the overall directions are not covered, changing the end-point viewing information.

* * * * *